US011272507B2

(12) United States Patent
Xu et al.

(10) Patent No.: US 11,272,507 B2
(45) Date of Patent: Mar. 8, 2022

(54) BANDWIDTH PART SWITCHING FOR MULTIPLE TRANSCEIVER NODES

(71) Applicant: QUALCOMM Incorporated, San Diego, CA (US)

(72) Inventors: Huilin Xu, San Diego, CA (US); Wanshi Chen, San Diego, CA (US); Alexandros Manolakos, San Diego, CA (US); Heechoon Lee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 157 days.

(21) Appl. No.: 16/517,509

(22) Filed: Jul. 19, 2019

(65) Prior Publication Data
US 2020/0029331 A1 Jan. 23, 2020

(51) Int. Cl.
H04W 72/04 (2009.01)
H04B 7/06 (2006.01)
H04W 74/08 (2009.01)
H04W 72/02 (2009.01)

(52) U.S. Cl.
CPC ...... *H04W 72/0453* (2013.01); *H04B 7/0695* (2013.01); *H04W 72/02* (2013.01); *H04W 72/042* (2013.01); *H04W 74/0808* (2013.01)

(58) Field of Classification Search
CPC ............. H04W 72/0453; H04W 72/02; H04W 72/042; H04W 74/0808; H04W 72/0413; H04W 72/1263; H04W 72/0446; H04W 72/12; H04W 72/1289; H04W 72/044; H04W 72/1268; H04W 72/14; H04W 74/006; H04W 16/10; H04B 7/0695; H04L 5/0091; H04L 5/0007; H04L 27/26025; H04L 1/1861; H04L 5/0055; H04L 5/0057; H04L 5/0053; H04L 27/2602; H04L 27/2613; H04L 5/001; H04L 5/0064; H04L 5/0087; H04L 5/0039; H04L 5/0092;
(Continued)

(56) References Cited
U.S. PATENT DOCUMENTS

2018/0183551 A1* 6/2018 Chou ................ H04L 5/0098
2019/0132862 A1* 5/2019 Jeon ................. H04L 5/0064
(Continued)

OTHER PUBLICATIONS

Vivo (3GPP TSG RAN WG1 NR AH#3 R1-1715648, Sep. 2017) (Year: 2017).*

(Continued)

*Primary Examiner* — Hardikkumar D Patel
(74) *Attorney, Agent, or Firm* — Holland & Hart LLP

(57) ABSTRACT

Methods, systems, and devices for wireless communications are described. A UE may monitor a first bandwidth part for communications from one or more transceiver nodes. The UE may receive a control message on the first bandwidth part from a first transceiver node that includes an indication of a second bandwidth part different from the first bandwidth part. The UE may determine whether the second bandwidth part is associated with each of the transceiver nodes. The UE may communicate with a second transceiver node on the second bandwidth part based on the control message and on a determination that the second bandwidth part is associated with the second transceiver node.

22 Claims, 20 Drawing Sheets

(58) Field of Classification Search
CPC ... H04L 5/0098; H04L 5/0026; H04L 5/0012; H04L 5/14; H04L 5/0042
See application file for complete search history.

(56) References Cited

U.S. PATENT DOCUMENTS

2019/0149380 A1* 5/2019 Babaei ............... H04L 5/001 370/330
2021/0211343 A1* 7/2021 Baldemair ........ H04W 72/1263

OTHER PUBLICATIONS

Vivo: "Remaining Details for Bandwidth Part Operation," 3GPP Draft; R1-1715648 BWP, 3rd Generation Partnership Project (3GPP), Mobile Competence Centre; 650, Route Des Lucioles; F-06921 Sophia-Antipolis Cedex; France, vol. RAN WG1, no. Nagoya, Japan; Sep. 18, 2017-Sep. 21, 2017, Sep. 17, 2017, XP051339114, 3 pages, Retrieved from the Internet: URL: http://www.3gpp.org/ftp/Meetings_3GPP_SYNC/RAN1/Docs/[retrieved on Sep. 17, 2017] figure 2, sections 1, 2, 2.1-2.3.

International Search Report and Written Opinion—PCT/US2019/042876—ISA/EPO—dated Oct. 15, 2019.

Mediatek Inc: "Summary of Bandwidth Part Remaining Issues", 3GPP Draft; R1-1807801_Summary of BWP Remaining Issues_R10, 3rd Generation Partnership Project (3GPP), Mobile Competence Centre, 650, Route Des Lucioles, F-06921 Sophia-Antipolis Cedex, France, vol. RAN WG1, No. Sanya, China; Apr. 16, 2018-Apr. 20, 2018, May 24, 2018, XP051463410, Retrieved from the Internet: URL:http://www.3gpp.org/ftp/tsg%5Fran/WG1%5FRL1/TSGR1%5F93/Docs [retrieved on May 24, 2018], section 6.3, 25 pages.

Motorola Mobility: "Addition of new NR MAC UL TBS test case 7.1.1.4.2.4", 3GPP Draft; R5-183141 7.1.1.4.2.4, 3rd Generation Partnership Project (3GPP), Mobile Competence Centre, 650, Route Des Lucioles, F-06921 Sophia-Antipolis Cedex, France, vol. RAN WG5, No. Busan, South Korea; May 21, 2018-May 25, 2018, May 25, 2018, XP051585487, Retrieved from the Internet: URL:http://www.3gpp.org/ftp/tsg%5Fran/WG5%5FTest%5Fex%2DT1/TSGR5%5F79%5FBusan/Docs/R5%2D183141%2Ezip [retrieved on May 25, 2018], section 2.1, 19 pages.

* cited by examiner

Single PDCCH, Multi-TRP
before and after

▨ Bandwidth Part 1

▨ Bandwidth Part 2

Single PDCCH,
multi TRP before and single TRP after

▨ Bandwidth Part 0

▩ Bandwidth Part 1

Multi PDCCH

▨ Bandwidth Part 0

▨ Bandwidth Part 1

▨ Bandwidth Part 2

BANDWIDTH PART SWITCHING FOR MULTIPLE TRANSCEIVER NODES

CROSS REFERENCES

The present Application for Patent claims priority to Greece Provisional Patent Application No. 20180100336 by Xu et al., entitled "Bandwidth Part Switching for Multiple Transceiver Nodes," filed Jul. 23, 2018, assigned to the assignee hereof.

BACKGROUND

The following relates generally to wireless communications, and more specifically to bandwidth part switching for multiple transceiver nodes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, a UE may communicate with two or more base stations (or transmission/reception points (transceiver nodes)) over time and frequency resources, such as over bandwidth parts (BWPs). In some cases, one or more of the transceiver nodes with which the UE is communicating may be switched from one BWP to another BWP. The BWP switch may be signaled to the UE. However, conventional techniques for signaling BWP switching are deficient.

SUMMARY

The described techniques relate to improved methods, systems, devices, or apparatuses that support bandwidth part switching for multiple transceiver nodes. Generally, the described techniques provide for coordinating communication between multiple transmission/reception points (which may be examples of transceiver nodes) and a user equipment (UE) that enables the UE to identify a new bandwidth part (BWP) for communicating with at least one of the transceiver nodes when the BWP of the transceiver node(s) is switched. The UE may identify the new BWP based on downlink control signaling.

A method of wireless communication at a UE is described. The method may include monitoring a first bandwidth part for communications from one or more transceiver nodes, receiving a control message on the first bandwidth part from a first transceiver node of the one or more transceiver nodes, where the control message includes an indication of a second bandwidth part different from the first bandwidth part, determining whether the second bandwidth part is associated with each of the one or more transceiver nodes, and communicating with at least a second transceiver node of the one or more transceiver nodes on the second bandwidth part based on the control message and on a determination that the second bandwidth part is associated with the second transceiver node.

An apparatus for wireless communication at a UE is described. The apparatus may include a processor, memory in electronic communication with the processor, and instructions stored in the memory. The instructions may be executable by the processor to cause the apparatus to monitor a first bandwidth part for communications from one or more transceiver nodes, receive a control message on the first bandwidth part from a first transceiver node of the one or more transceiver nodes, where the control message includes an indication of a second bandwidth part different from the first bandwidth part, determine whether the second bandwidth part is associated with each of the one or more transceiver nodes, and communicate with at least a second transceiver node of the one or more transceiver nodes on the second bandwidth part based on the control message and on a determination that the second bandwidth part is associated with the second transceiver node.

Another apparatus for wireless communication at a UE is described. The apparatus may include means for monitoring a first bandwidth part for communications from one or more transceiver nodes, receiving a control message on the first bandwidth part from a first transceiver node of the one or more transceiver nodes, where the control message includes an indication of a second bandwidth part different from the first bandwidth part, determining whether the second bandwidth part is associated with each of the one or more transceiver nodes, and communicating with at least a second transceiver node of the one or more transceiver nodes on the second bandwidth part based on the control message and on a determination that the second bandwidth part is associated with the second transceiver node.

A non-transitory computer-readable medium storing code for wireless communication at a UE is described. The code may include instructions executable by a processor to monitor a first bandwidth part for communications from one or more transceiver nodes, receive a control message on the first bandwidth part from a first transceiver node of the one or more transceiver nodes, where the control message includes an indication of a second bandwidth part different from the first bandwidth part, determine whether the second bandwidth part is associated with each of the one or more transceiver nodes, and communicate with at least a second transceiver node of the one or more transceiver nodes on the second bandwidth part based on the control message and on a determination that the second bandwidth part is associated with the second transceiver node.

In some examples of the method, apparatuses, and non-transitory computer-readable medium described herein, communicating with at least the second transceiver node on the second bandwidth part may include operations, features, means, or instructions for transmitting a first signal to the second transceiver node on the second bandwidth part or receiving a second signal from the second transceiver node on the second bandwidth part.

In some examples of the method, apparatuses, and non-transitory computer-readable medium described herein, the second transceiver node may be the same as the first transceiver node. Some examples of the method, apparatuses, and non-transitory computer-readable medium described herein may further include operations, features, means, or instructions for communicating with the first transceiver node on the second bandwidth part based on the control message and on a determination that the second bandwidth part is associated with the first transceiver node.

Some examples of the method, apparatuses, and non-transitory computer-readable medium described herein may further include operations, features, means, or instructions for refraining from communicating with the first transceiver node based on the control message and on a determination that the second bandwidth part is not associated with the first transceiver node. In some examples of the method, apparatuses, and non-transitory computer-readable medium described herein, monitoring the first bandwidth part may include operations, features, means, or instructions for monitoring the first bandwidth part for communications from the second transceiver node.

In some examples of the method, apparatuses, and non-transitory computer-readable medium described herein, the control message includes one or more indications corresponding to each of the one or more transceiver nodes, where the one or more indications indicates whether the UE should communicate with the respective transceiver node on the second bandwidth part. Some examples of the method, apparatuses, and non-transitory computer-readable medium described herein may further include operations, features, means, or instructions for determining, based on a first indication of the one or more indications, whether the UE should communicate with the first transceiver node on the second bandwidth part.

Some examples of the method, apparatuses, and non-transitory computer-readable medium described herein may further include operations, features, means, or instructions for communicating with the first transceiver node on the second bandwidth part based on the control message, on a determination that the UE should communicate with the first transceiver node on the second bandwidth part, and on a determination that the second bandwidth part is associated with the first transceiver node. Some examples of the method, apparatuses, and non-transitory computer-readable medium described herein may further include operations, features, means, or instructions for refraining from communicating with the first transceiver node on the second bandwidth part based on a determination that the UE should not communicate with the first transceiver node on the second bandwidth part.

Some examples of the method, apparatuses, and non-transitory computer-readable medium described herein may further include operations, features, means, or instructions for determining, based on a second indication of the one or more indications, whether the UE should communicate with the second transceiver node on the second bandwidth part, where communicating with the second transceiver node on the second bandwidth part may be based on a determination that the UE should communicate with the second transceiver node on the second bandwidth part.

In some examples of the method, apparatuses, and non-transitory computer-readable medium described herein, the control message may be received via a physical downlink control channel (PDCCH). In some examples of the method, apparatuses, and non-transitory computer-readable medium described herein, the control message may be received via downlink control information (DCI). In some examples of the method, apparatuses, and non-transitory computer-readable medium described herein, the first transceiver node includes a first transmission/reception point (TRP) and the second transceiver node includes a second TRP.

Some examples of the method, apparatuses, and non-transitory computer-readable medium described herein may further include operations, features, means, or instructions for receiving configuration information indicating whether the second bandwidth part may be associated with each of the one or more transceiver nodes, where determining whether the second bandwidth part is associated with each of the one or more transceiver nodes includes determining whether the second bandwidth part is associated with the first transceiver node and with the second transceiver node based on the configuration information.

A method of wireless communication at a UE is described. The method may include receiving a first control message on a first bandwidth part from a first transceiver node, where the first control message includes an indication of a second bandwidth part different from the first bandwidth part, receiving a second control message on a third bandwidth part from a second transceiver node, where the second control message includes an indication of a fourth bandwidth part different from the third bandwidth part, determining whether the second bandwidth part is associated with the first transceiver node, and communicating with the first transceiver node on the second bandwidth part based on the first control message and on a determination that the second bandwidth part is associated with the second transceiver node.

An apparatus for wireless communication at a UE is described. The apparatus may include a processor, memory in electronic communication with the processor, and instructions stored in the memory. The instructions may be executable by the processor to cause the apparatus to receive a first control message on a first bandwidth part from a first transceiver node, where the first control message includes an indication of a second bandwidth part different from the first bandwidth part, receive a second control message on a third bandwidth part from a second transceiver node, where the second control message includes an indication of a fourth bandwidth part different from the third bandwidth part, determine whether the second bandwidth part is associated with the first transceiver node, and communicate with the first transceiver node on the second bandwidth part based on the first control message and on a determination that the second bandwidth part is associated with the second transceiver node.

Another apparatus for wireless communication at a UE is described. The apparatus may include means for receiving a first control message on a first bandwidth part from a first transceiver node, where the first control message includes an indication of a second bandwidth part different from the first bandwidth part, receiving a second control message on a third bandwidth part from a second transceiver node, where the second control message includes an indication of a fourth bandwidth part different from the third bandwidth part, determining whether the second bandwidth part is associated with the first transceiver node, and communicating with the first transceiver node on the second bandwidth part based on the first control message and on a determination that the second bandwidth part is associated with the second transceiver node.

A non-transitory computer-readable medium storing code for wireless communication at a UE is described. The code may include instructions executable by a processor to receive a first control message on a first bandwidth part from a first transceiver node, where the first control message includes an indication of a second bandwidth part different from the first bandwidth part, receive a second control message on a third bandwidth part from a second transceiver node, where the second control message includes an indication of a fourth bandwidth part different from the third bandwidth part, determine whether the second bandwidth part is associated with the first transceiver node, and communicate with the first transceiver node on the second bandwidth part based on the first control message and on a determination that the second bandwidth part is associated with the first transceiver node.

In some examples of the method, apparatuses, and non-transitory computer-readable medium described herein, communicating with the first transceiver node on the second bandwidth part may include operations, features, means, or instructions for transmitting a first signal to the first transceiver node on the second bandwidth part or receiving a second signal from the first transceiver node on the second bandwidth part.

Some examples of the method, apparatuses, and non-transitory computer-readable medium described herein may further include operations, features, means, or instructions for determining whether the fourth bandwidth part is associated with the second transceiver node and communicating with the second transceiver node on the fourth bandwidth part based on the second control message and on a determination that the fourth bandwidth part is associated with the second transceiver node. Some examples of the method, apparatuses, and non-transitory computer-readable medium described herein may further include operations, features, means, or instructions for refraining from communicating with the second transceiver node on the fourth bandwidth part based on a determination that the fourth bandwidth part is not associated with the second transceiver node.

Some examples of the method, apparatuses, and non-transitory computer-readable medium described herein may further include operations, features, means, or instructions for communicating with the second transceiver node on the third bandwidth part based on a determination that the fourth bandwidth part is not associated with the second transceiver node. Some examples of the method, apparatuses, and non-transitory computer-readable medium described herein may further include operations, features, means, or instructions for refraining from communicating with the second transceiver node based on a determination that the fourth bandwidth part is not associated with the second transceiver node.

In some examples of the method, apparatuses, and non-transitory computer-readable medium described herein, the first bandwidth part is the same as the third bandwidth part. In some examples of the method, apparatuses, and non-transitory computer-readable medium described herein, the second bandwidth part is the same as the fourth bandwidth part. In some examples of the method, apparatuses, and non-transitory computer-readable medium described herein, the first control message is received via a first PDCCH.

In some examples of the method, apparatuses, and non-transitory computer-readable medium described herein, the second control message may be received via a second PDCCH. In some examples of the method, apparatuses, and non-transitory computer-readable medium described herein, the first control message and the second control message may be received via DCI. In some examples of the method, apparatuses, and non-transitory computer-readable medium described herein, the first transceiver node includes a first transmission/reception point (TRP) and the second transceiver node includes a second TRP.

Some examples of the method, apparatuses, and non-transitory computer-readable medium described herein may further include operations, features, means, or instructions for receiving configuration information indicating whether the second bandwidth part may be associated with the first transceiver node, where determining whether the second bandwidth part may be associated with the first transceiver node includes determining whether the second bandwidth part may be associated with the first transceiver node based on the configuration information.

A method of wireless communication at a base station is described. The method may include transmitting, to a device, configuration information indicating that a first bandwidth part is associated with a first transceiver node and a second bandwidth part is associated with a second transceiver node, determining that a network condition has been met, selecting, based on the determination that the network condition has been met, a third bandwidth part to be associated with the first transceiver node, the third bandwidth part different from the first bandwidth part, and initiating a control message to be transmitted to the device from the first transceiver node on the first bandwidth part, where the control message includes an indication of the third bandwidth part.

An apparatus for wireless communication at a base station is described. The apparatus may include a processor, memory in electronic communication with the processor, and instructions stored in the memory. The instructions may be executable by the processor to cause the apparatus to transmit, to a device, configuration information indicating that a first bandwidth part is associated with a first transceiver node and a second bandwidth part is associated with a second transceiver node, determine that a network condition has been met, select, based on the determination that the network condition has been met, a third bandwidth part to be associated with the first transceiver node, the third bandwidth part different from the first bandwidth part, and initiate a control message to be transmitted to the device from the first transceiver node on the first bandwidth part, where the control message includes an indication of the third bandwidth part.

Another apparatus for wireless communication at a base station is described. The apparatus may include means for transmitting, to a device, configuration information indicating that a first bandwidth part is associated with a first transceiver node and a second bandwidth part is associated with a second transceiver node, determining that a network condition has been met, selecting, based on the determination that the network condition has been met, a third bandwidth part to be associated with the first transceiver node, the third bandwidth part different from the first bandwidth part, and initiating a control message to be transmitted to the device from the first transceiver node on the first bandwidth part, where the control message includes an indication of the third bandwidth part.

A non-transitory computer-readable medium storing code for wireless communication at a base station is described. The code may include instructions executable by a processor to transmit, to a device, configuration information indicating that a first bandwidth part is associated with a first transceiver node and a second bandwidth part is associated with a second transceiver node, determine that a network condition has been met, select, based on the determination that the network condition has been met, a third bandwidth part to be associated with the first transceiver node, the third bandwidth part different from the first bandwidth part, and initiate a control message to be transmitted to the device from the first transceiver node on the first bandwidth part, where the control message includes an indication of the third bandwidth part.

Some examples of the method, apparatuses, and non-transitory computer-readable medium described herein may further include operations, features, means, or instructions for selecting, based on the determination that the network condition may have been met, a fourth bandwidth part to be associated with the second transceiver node, the fourth bandwidth part different from the second bandwidth part and initiating a second control message to be transmitted to the device from the second transceiver node on the second bandwidth part, where the second control message includes an indication of the fourth bandwidth part.

In some examples of the method, apparatuses, and non-transitory computer-readable medium described herein, the third bandwidth part is selected to be associated with the second transceiver node. In some examples of the method, apparatuses, and non-transitory computer-readable medium described herein, selecting the fourth bandwidth part may include operations, features, means, or instructions for determining whether the device supports communication via multiple bandwidth parts.

In some examples of the method, apparatuses, and non-transitory computer-readable medium described herein, the control message includes a first indication of whether the UE should communicate with the first transceiver node on the third bandwidth part and a second indication of whether the UE should communicate with the second transceiver node on the third bandwidth part. In some examples of the method, apparatuses, and non-transitory computer-readable medium described herein, selecting the third bandwidth part may include operations, features, means, or instructions for determining that the first transceiver node is associated with the third bandwidth part.

In some examples of the method, apparatuses, and non-transitory computer-readable medium described herein, selecting the third bandwidth part may include operations, features, means, or instructions for determining that the second transceiver node is associated with the third bandwidth part. In some examples of the method, apparatuses, and non-transitory computer-readable medium described herein, selecting the third bandwidth part may include operations, features, means, or instructions for selecting the third bandwidth part based on a difference in a width of the third bandwidth part relative to a width of the first bandwidth part.

In some examples of the method, apparatuses, and non-transitory computer-readable medium described herein, selecting the third bandwidth part may include operations, features, means, or instructions for selecting the third bandwidth part from a pre-defined set of bandwidth parts. In some examples of the method, apparatuses, and non-transitory computer-readable medium described herein, determining that the network condition may have been met may include operations, features, means, or instructions for determining that a signal quality metric for the third bandwidth part may be better than the signal quality metric for the first bandwidth part.

In some examples of the method, apparatuses, and non-transitory computer-readable medium described herein, determining that the network condition may have been met may include operations, features, means, or instructions for determining that a communication rate for the device may be below a threshold. In some examples of the method, apparatuses, and non-transitory computer-readable medium described herein, the configuration information may be transmitted to the device via RRC signaling.

In some examples of the method, apparatuses, and non-transitory computer-readable medium described herein, initiating the control message to be transmitted may include operations, features, means, or instructions for initiating the control message to be transmitted via a PDCCH. In some examples of the method, apparatuses, and non-transitory computer-readable medium described herein, the control message includes DCI including the indication of the third bandwidth.

Some examples of the method, apparatuses, and non-transitory computer-readable medium described herein may further include operations, features, means, or instructions for communicating with the device via the first transceiver node and the third bandwidth part after initiating the control message. In some examples of the method, apparatuses, and non-transitory computer-readable medium described herein, the first transceiver node includes a first transmission/reception point (TRP) and the second transceiver node includes a second TRP.

DETAILED DESCRIPTION

The described techniques relate to improved methods, systems, devices, or apparatuses that support bandwidth switching for multiple transceiver nodes. Generally, the described techniques provide for coordinating communication between multiple transceiver nodes (such as transmission/reception points (TRPs)) and a user equipment (UE) that enables the UE to identify a new (e.g., different) bandwidth part (BWP) for communicating with at least one of the transceiver nodes when the BWP of the transceiver node(s) is switched.

In some cases, a UE may receive configuration information (e.g., via radio resource control (RRC) signaling) when it establishes communication with a base station that identifies multiple transceiver nodes associated with multiple corresponding BWPs. The UE may monitor the BWP(s) for communications from the corresponding transceiver node and may communicate with each transceiver node via the corresponding BWP. The UE may receive, from one or more of the transceiver nodes, a control message(s) on the corresponding BWP indicating that the BWP for the transceiver node is being switched. In some cases, a single control message received from a single transceiver node indicates that the BWPs for multiple transceiver nodes are being switched to the same new BWP. In some cases, multiple control messages received from multiple transceiver nodes each include an indication that the BWP for the corresponding transceiver node is being switched.

In some cases, the control message(s) are communicated via downlink control signaling; e.g., the control messages may be received by the UE within downlink control information (DCI) on a physical downlink control channel (PDCCH). Based on the control message(s), the UE may subsequently monitor the new BWP(s) for communications from the corresponding transceiver node(s) and may communicate with one or more of the transceiver nodes via the new BWP(s).

Beneficially, such an approach may enable a base station to efficiently signal to a UE that one or more transceiver nodes are being dynamically switched to a new uplink and/or downlink BWPs. Dynamically switching multiple transceiver nodes to new BWPs may enable a wireless system to provide improved signal quality to the UE under changing channel conditions and may allow a base station to reallocate resources (e.g., BWPs) based on demand, for example.

Aspects of the disclosure are initially described in the context of a wireless communications system. Examples of bandwidth part switching for multiple transceiver nodes are then described. Aspects of the disclosure are further illustrated by and described with reference to apparatus diagrams, system diagrams, and flowcharts that relate to bandwidth part switching for multiple transceiver nodes.

Figure 1:
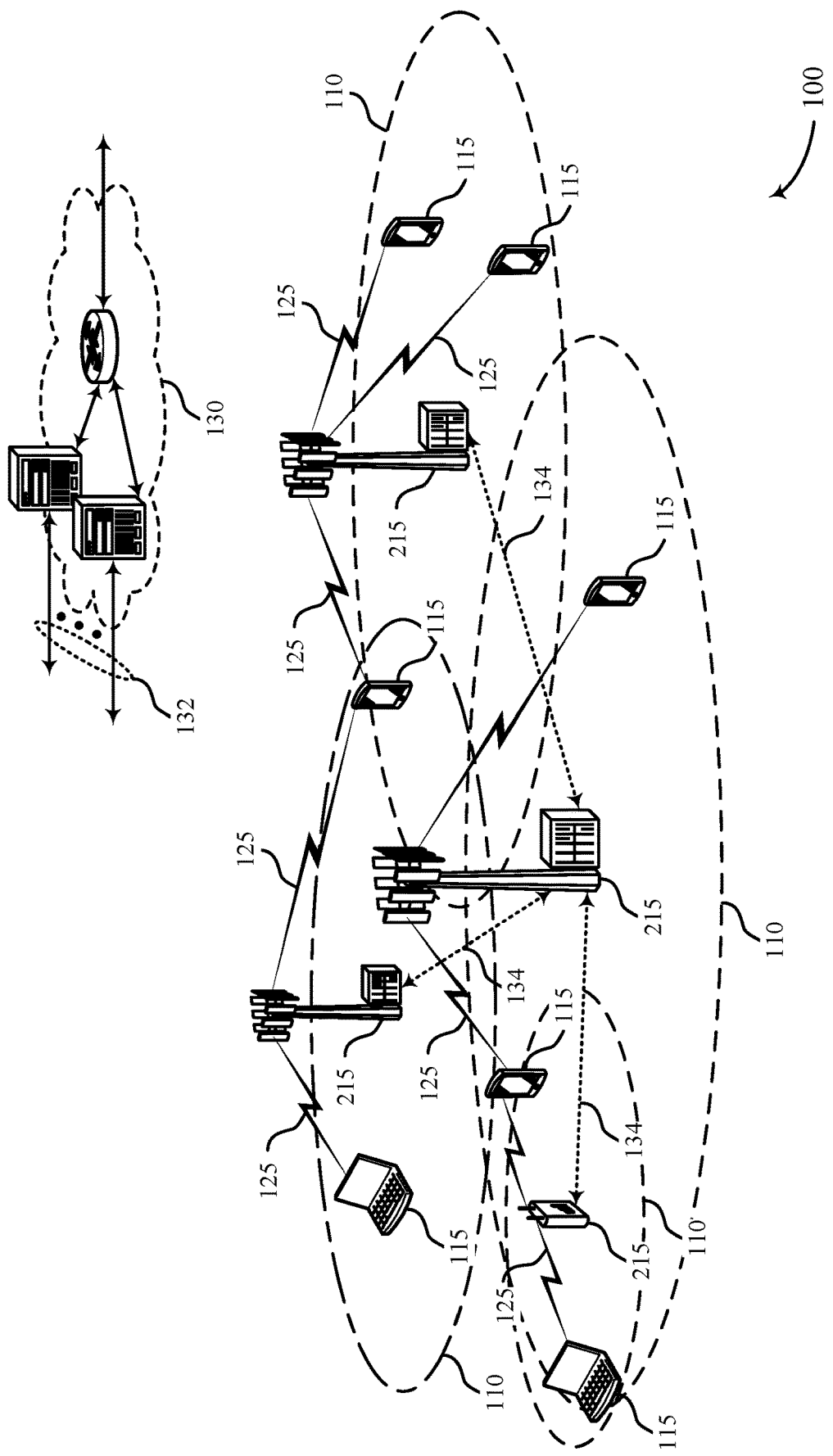
FIGS. 1 and 2 illustrate examples of a system for wireless communications that supports bandwidth part switching for multiple transceiver nodes in accordance with aspects of the present disclosure.

FIG. 1 illustrates an example of a wireless communications system 100 that supports bandwidth part switching for multiple transceiver nodes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 and/or by one or more different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, each of which may be referred to as a radio head, a smart radio head, or a transmission/reception point (TRP). In some cases, a TRP may be an example of a transceiver node. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) Absolute Radio Frequency Channel Number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In some cases, a physical downlink control channel (PDCCH) or physical uplink control channel (PUCCH) may be used to communicate control signals between a base station and a UE (e.g., via one or more transceiver nodes, such as TRPs). A physical downlink shared channel (PDSCH) or physical uplink shared channel (PUSCH) may be used to communicate data or other signals between a base station and a UE (e.g., via one or more transceiver nodes, such as TRPs).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Wireless communications systems such as an NR system may utilize any combination of licensed, shared, and unlicensed spectrum bands, among others. The flexibility of enhanced Component Carrier (eCC) symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a single UE 115 may be configured for communication with multiple transceiver nodes (e.g., multiple transceiver nodes associated with or included in base station 105) using one or more corresponding bandwidth parts (BWPs). In some cases, a BWP may be a contiguous set of physical resource blocks (RBs).

In some cases, different BWPs may have different widths. For example, one BWP may be wider than another BWP and may therefore be associated with a larger set of contiguous RBs or a larger frequency band. Thus, in some cases, one BWP may be capable of providing more communication bandwidth than another BWP.

In some cases, each transceiver node may be associated with a corresponding active uplink BWP and/or downlink BWP on which the transceiver node may communicate with the UE (e.g., via an uplink connection and/or downlink connection). In some cases, a transceiver node may be associated with an uplink BWP that is different than the downlink BWP; e.g., for communications using FDD. In some cases, a transceiver node may be associated with the same BWP for both the uplink and the downlink; e.g., for communications using TDD.

In some cases, a UE may refrain from communicating with (e.g., transmitting signals to or receiving signals from) a transceiver node on resources or frequencies that are outside of the active uplink and/or downlink BWPs associated with the transceiver node.

In some cases, multiple transceiver nodes may communicate with a UE via the same BWP. For example, multiple transceiver nodes may use same downlink BWP to transmit signals to the UE, and/or multiple transceiver nodes may use the same uplink BWP to receive signals from the UE. In some cases, multiple transceiver nodes may communicate with a UE via multiple (different) BWPs, with each transceiver node associated with corresponding uplink and downlink BWPs.

In some cases, one or more transceiver nodes may be switched (e.g., by base station 105) from one BWP to another BWP. For example, one or more transceiver nodes may be switched from a first active uplink or downlink BWP to a second (different) active uplink or downlink BWP, respectively. In this case, a base station 105 may signal the BWP switch to a UE 115 (e.g., via the transceiver node(s)) to inform the UE 115 that it should communicate with the transceiver node(s) on a different uplink or downlink BWP.

Figure 2:
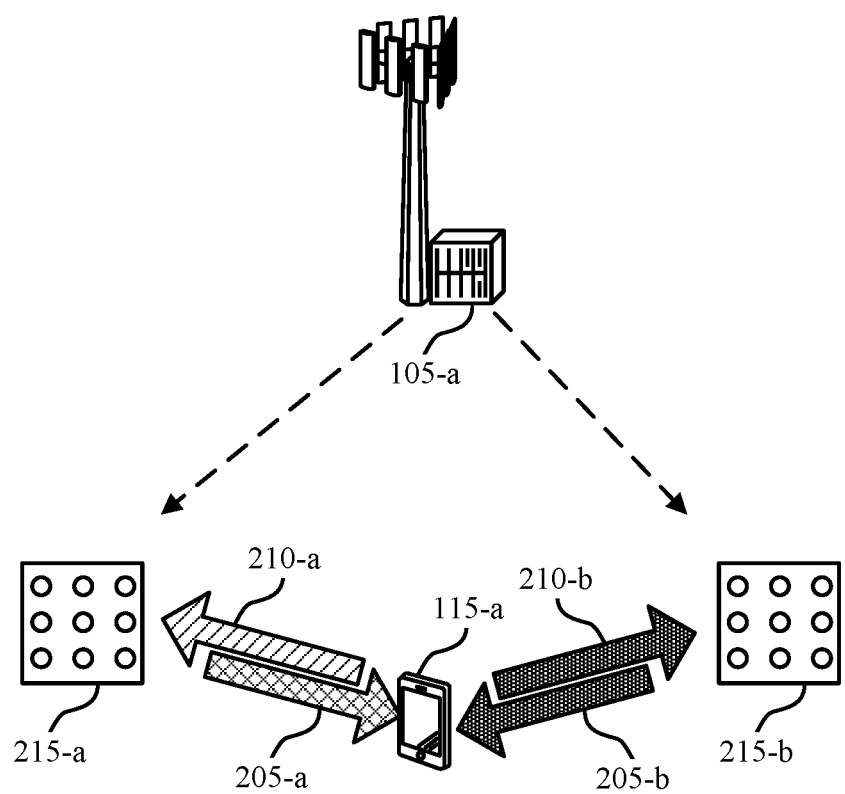

FIG. 2 illustrates an example of a wireless communications system 200 that supports bandwidth switching for multiple transceiver nodes in accordance with aspects of the present disclosure. In some examples, wireless communications system 200 may implement aspects of wireless communication system 100.

Base station 105-a may include or be associated with transceiver nodes 215-a, 215-b, and may communicate with UE 115-a via one or both transceiver nodes 215. Transceiver nodes 215 and UE 115-a may establish downlink connections 205 (e.g., downlink connection 205-a for transceiver node 215-a and downlink connection 205-b for transceiver node 215-b) and uplink connections 210 (e.g., uplink connection 210-a for transceiver node 215-a and uplink connection 210-b for transceiver node 215-b) for communication. One or both transceiver nodes 215 may be able to transmit downlink messages or signals (e.g., PDCCH and/or PDSCH messages or signals) to UE 115-a on a corresponding downlink connection 205, and UE 115-a may be able to transmit uplink messages or signals (e.g., PUCCH and/or PUSCH messages or signals) to transceiver nodes 215 on a corresponding uplink connection 210. In some cases, transceiver node 215-a and transceiver node 215-b may each be an example of, or associated with, a base station 105 as described herein. In some cases, transceiver node 215-a and transceiver node 215-b may each be a TRP.

Base station 105-a may configure UE 115-a with multiple control resource sets for each serving cell per slot. Each serving cell may indicate active uplink and/or downlink BWP(s) of the serving cell, corresponding to frequency resources of the cell which are assigned to UE 115-a. The uplink connection 210 and/or downlink connection 205 connection may be associated with an active uplink and/or downlink BWP, such that UE 115-a may communicate with the transceiver nodes 215 on the transceiver node's corresponding active uplink and/or downlink BWP. In some cases, UE 115-a may monitor the downlink BWP(s) for PDCCH messages from one or both of the transceiver nodes 215.

In some cases, a UE 115-a may receive configuration information (e.g., from base station 105-a via a transceiver node 215) that indicates an active uplink and/or downlink BWP associated with each of multiple transceiver nodes 215. The UE 115-a may receive the configuration information via RRC signaling when the UE establishes a connection with transceiver nodes 215 or base station 105, for example. An active BWP may be a BWP on which the transceiver node 215 and UE 115-a communicate with each other via an uplink connection 210 or downlink connection 205. Based on the configuration information, the UE 115-a may monitor the downlink BWP(s) indicated by the configuration information for communications from one or more of the transceiver nodes 215, and/or may communicate with one or more of the transceiver nodes 215 via the uplink and/or downlink BWP(s) indicated in the configuration information. For example, a UE 115-a may receive a signal from a transceiver node 215 on the transceiver node's active downlink BWP and may transmit a signal to the transceiver node 215 on the transceiver node's active uplink BWP.

In some cases, each BWP may be associated with a BWP identifier. In some cases, the maximum total number of unique BWP identifiers available for all configured transceiver nodes is limited; e.g., the maximum available BWP identifiers may be two, or four, or eight, or another number. A BWP identifier may be represented by a multi-bit indicator. If the maximum number of BWP identifiers is four, for example, a BWP identifier may be represented by a two-bit indicator. If the maximum number of BWP identifiers is eight, for example, a BWP identifier may be represented by a three-bit indicator. In some cases, each BWP associated with a BWP identifier has the same numerology, frequency location, and bandwidth.

In some cases, a single BWP identifier may be available to multiple transceiver nodes 215, such that multiple transceiver nodes may communicate with a UE 115-a via a BWP associated with the BWP identifier. In some cases, if different transceiver nodes are configured as different serving cells, the same BWP identifier may be configured (e.g., via RRC signaling) in all serving cells.

In some cases, each transceiver node 215 may be associated with a set of uplink BWP identifiers and/or a set of downlink BWP identifiers that identify a corresponding set of uplink BWPs and/or downlink BWPs on which transceiver node 215 may communicate with UE 115-a. In some cases, the set of uplink BWP identifiers may be the same as the set of downlink BWP identifiers. In some cases, the set of uplink BWP identifiers may be different than the set of downlink BWP identifiers. In some cases, a UE may receive configuration information indicating a set of uplink BWP identifiers and a set of downlink BWP identifiers that are associated with a transceiver node 215. In some cases, a BWP is considered to be associated with a transceiver node (and vice versa) if the set of BWP identifiers associated with the transceiver node includes a BWP identifier corresponding to the BWP.

In some cases, different transceiver nodes may be associated with different sets of BWP identifiers. For example, one transceiver node may be associated with a set of BWP identifiers (e.g., a set of uplink BWP identifiers and/or a set of downlink BWP identifiers) that includes BWP identifiers 0, 1, and 2, which may represent three different BWPs with which the transceiver node is associated and may use for communicating with UE 115-a. Another transceiver node may be associated with a set of BWP identifiers that includes BWP identifiers 1, 2, and 3. In some cases, two transceiver nodes may be associated with sets of BWP identifiers that have one or more BWP identifiers in common and one or more BWP identifiers that are different. In some cases, two transceiver nodes may be associated with corresponding sets of BWP identifiers that include all of the same BWP identifiers or none of the same BWP identifiers.

As depicted in FIG. 2, in some cases, a transceiver node 215 may be configured (e.g., by a base station) to operate using an active uplink BWP that is different from the active downlink BWP. For example, transceiver node 215-a may be configured to operate using downlink BWP 1 and uplink BWP 2. In some cases, as depicted in FIG. 2, the active downlink BWP may be different than the active uplink BWP for FDD communications. In this case, the uplink BWP and the downlink BWP may be switched independently.

In some cases, a transceiver node 215 may be configured to operate using the same BWP for the uplink BWP and downlink BWP. For example, transceiver node 215-b may be configured to operate using BWP 3 for both the downlink connection 205-b and the uplink connection 210-b. In some cases, the active downlink BWP may be the same as the active uplink BWP for TDD communications. In this case, the uplink BWP and the downlink BWP may be switched together (e.g., not independently).

As previously discussed, in some cases, a base station 105 may initiate a switch of an active BWP for a transceiver node to a new (different) BWP. A base station may choose to initiate a BWP switch based on various network conditions. For example, a base station may switch an active BWP to a new BWP if the signal quality for the new BWP is higher than the signal quality for the active BWP, which may be determined based on a signal quality metric (e.g., a signal-to-noise (SNR) metric or another signal quality metric).

A base station may initiate a BWP switch in order to reallocate communication resources. As previously discussed, different BWPs may have different widths, and thus may provide different communication bandwidths. If a communication rate for a UE is low, for example, a base station may choose to switch the BWP(s) of transceiver nodes communicating with the UE to a different BWP that provides less bandwidth and reallocate the original active BWP(s) to other UEs. In some cases, a base station may choose to switch a BWP when it determines that a communication rate for a UE is below a threshold (such as a bits-per-second (BPS) rate threshold, or another type of threshold).

A base station 105-a may select a new BWP for switching a transceiver node based on a variety of factors. For example, a base station may select a new BWP based on whether the new BWP is associated with one or more of the transceiver nodes 215. In some cases, a base station 105-a may select a new bandwidth part from a pre-defined set of BWPs, such as from a set of uplink or downlink BWP identifiers associated with a transceiver node.

A base station 105-a may select a new BWP based on a difference in width of the new BWP relative to the width of the active BWP. For example, a base station may select a new BWP that provides more (or less) communication bandwidth than the active BWP based on changing network conditions and/or device usage or communication rates.

In some cases, a base station 105-a may initiate a BWP switch for a transceiver node 215 by transmitting an indication of a new BWP to a UE 115-a via the same or a different transceiver node 215. In some cases, a base station 105-a may transmit the indication of the new BWP in downlink control information (DCI). In some cases, a base station may transmit the indication of the new BWP in a PDCCH message.

In some cases, UE 115-a may receive one or more PDCCH or PDSCH messages or signals on a downlink connection 205 from one or more transceiver nodes on each transceiver node's active downlink BWP. In some cases, a PDCCH message received from a transceiver node may include an indication that the active uplink and/or downlink BWP for the transceiver node is being switched to a new BWP. In some cases, the indication may be received within DCI.

In some cases, a single PDCCH schedules a single PDSCH where separate layers are transmitted from separate transceiver nodes 215. In some cases, a single PDCCH schedules a single PDSCH where each layer is transmitted from all transceiver nodes 215 jointly. In some cases, multiple separate PDCCHs each schedule a respective PDSCH where each PDSCH is transmitted from a separate transceiver node.

As discussed herein, in some cases, a single control message (e.g., a PDCCH message) from a single transceiver node may indicate that the active BWP for multiple transceiver nodes is being switched to a new BWP. In some cases, based on the single control message, multiple transceiver nodes may be switched to the same BWP. In some cases, multiple transceiver nodes 215 may be switched to the same BWP simultaneously or nearly simultaneously. For example, the UE 115-a may be configured, simultaneously or nearly simultaneously, to communicate on the new BWP with the multiple transceiver nodes.

In some cases, multiple separate control messages (e.g., multiple PDCCH messages) received from multiple corresponding transceiver nodes 215 may indicate that each of the transceiver nodes is being switched to a different BWP. In this case, the BWP switch for each transceiver node 215 may be independently controlled by the separate control messages, which may be received by the UE at different times. In this case, each of the transceiver nodes may be switched to a new BWP at different times or simultaneously or nearly simultaneously, depending on the timing of the messages.

FIGS. 3-10 depict several examples of BWP switching sequences that support bandwidth part switching for multiple transceiver nodes. Such examples are for illustrative purposes only and are not intended to be exhaustive. Other switching sequences may be supported or implemented in a wireless communication system without departing from the scope of the disclosure.

Figure 3A:
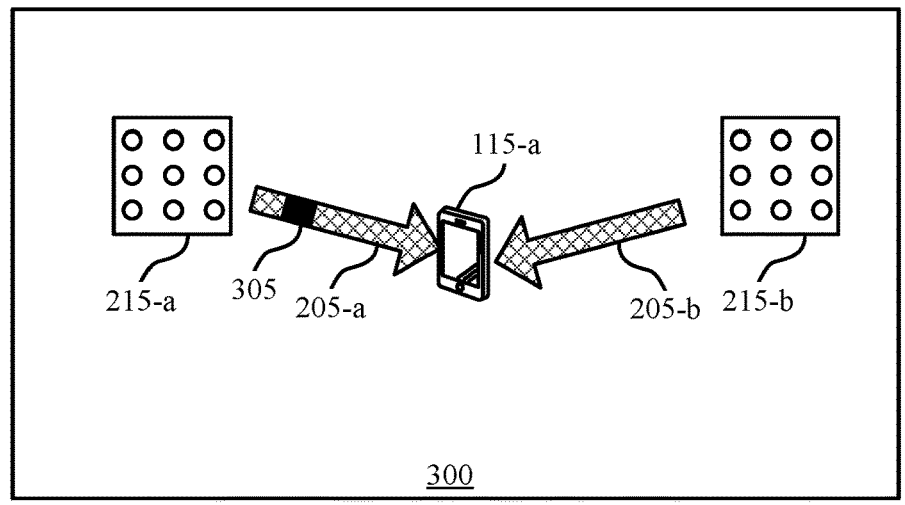
FIGS. 3A-3B illustrate an example of a switching sequence that supports bandwidth part switching for multiple transceiver nodes in accordance with aspects of the present disclosure.
Figure 3B:
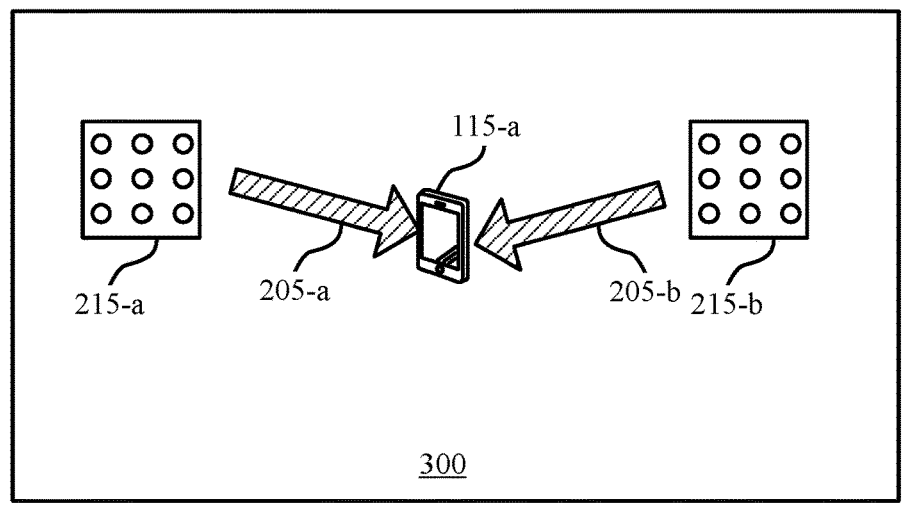

FIGS. 3A-3B illustrate an example of a wireless communication system 300 that supports bandwidth part switching for multiple transceiver nodes in accordance with aspects of the present disclosure. In some examples, wireless communication system 300 may implement aspects of wireless communication system 100. In some examples, FIG. 3A illustrates wireless communication system 300 before BWP switching, and FIG. 3B illustrates wireless communication system 300 after BWP switching. FIGS. 3A-3B may depict an example of BWP switching using a single control message (e.g., a single PDCCH).

For simplicity, FIGS. 3A-3B only depict downlink connections 205 and switching of the associated downlink BWPs between transceiver nodes 215 and UE 115-a. However, a similar BWP switching approach may be applied to uplink BWPs, and to combined downlink/uplink carriers that use the same BWP for both the uplink BWP and the downlink BWP (e.g., for TDD mode communications).

In this example, transceiver node 215-a may be associated with a set of downlink BWP identifiers that includes BWP identifiers 0, 1, and 2. Thus, transceiver node 215-a may be associated with BWP 0, BWP 1, and BWP 2 as downlink BWPs.

Transceiver node 215-*b* may be associated with a set of downlink BWP identifiers that includes BWP identifiers 1, 2, and 3. Thus, transceiver node 215-*b* may be associated with BWP 1, BWP 2, and BWP 3 as downlink BWPs. Thus, in this example, transceiver node 215-*a* and transceiver node 215-*b* are both associated with BWP 1 and BWP 2 as downlink BWPs.

As depicted in FIG. 3A, UE 115-*a* may initially be configured (e.g., via RRC signaling) to monitor downlink connections 205 from both transceiver nodes 215 by monitoring BWP 1. Thus, transceiver node 215-*a* and transceiver node 215-*b* may initially be operable to communicate with UE 115-*a* on the same active downlink BWP (BWP 1), and UE 115-*a* may receive signals (e.g., PDCCH or PDSCH transmissions, including control messages) from transceiver node 215-*a* and/or transceiver node 215-*b* on BWP 1. In some cases, UE 115-*a* may receive a control message from transceiver node 215-*a* and/or transceiver node 215-*b* on BWP 1 within downlink control information (DCI) transmitted on a PDCCH.

In this example, UE 115-*a* receives a control message 305 from transceiver node 215-*a* on BWP 1. The control message 305 may include an indication of a new BWP (BWP 2). The indication may include, for example, a multi-bit indicator associated with BWP identifier 2. In some cases, UE 115-*a* may determine whether the new BWP is associated with transceiver node 215-*a* and/or transceiver node 215-*b*; e.g., whether BWP 0 is included in the set of downlink BWP identifiers for transceiver nodes 215-*a* and 215-*b*.

As depicted in FIG. 3B, based on the control message 305 and on a determination that BWP 2 is associated with both transceiver nodes 215, UE 115-*a* may switch the active downlink BWP for transceiver node 215-*a* and transceiver node 215-*b* from BWP 1 to BWP 2. For example, UE 115-*a* may be configured (e.g., based on the control message 305) to monitor downlink connections 205 from transceiver node 215-*a* and transceiver node 215-*b* by monitoring BWP 2, which may be associated with BWP identifier 2. For example, UE 115-*a* may be configured (e.g., based on the control message 305) to communicate with (e.g., receive signals from) transceiver node 215-*a* and transceiver node 215-*b* on BWP 2. Thus, BWP 2 may become the active downlink BWP for both transceiver node 215-*a* and transceiver node 215-*b*, and UE 115-*a* may subsequently receive signals or control messages from transceiver node 215-*a* and/or transceiver node 215-*b* on BWP 2.

In some cases, after UE 115-*a* has received the control message 305 switching the active downlink BWP from BWP 1 to BWP 2 for both transceiver nodes 215, UE 115-*a* may refrain from monitoring BWP 1 or receiving signals from transceiver node 215-*a* and transceiver node 215-*b* on BWP 1.

In some cases, control message 305 may include an indication, for each transceiver node 215, of whether the UE 115-*a* should communicate with the respective transceiver node on the new BWP. In some cases, the UE 115-*a* may determine whether UE 115-*a* should communicate with each transceiver node 215 on the new BWP based on the indication for each transceiver node. In some cases, if UE 115-*a* determines that is should not communicate with the transceiver node 215 on the new BWP, UE 115-*a* may refrain from communicating with the transceiver node 215 on the new BWP. Such operation is described in more detail with reference to FIG. 8.

Figure 4A:
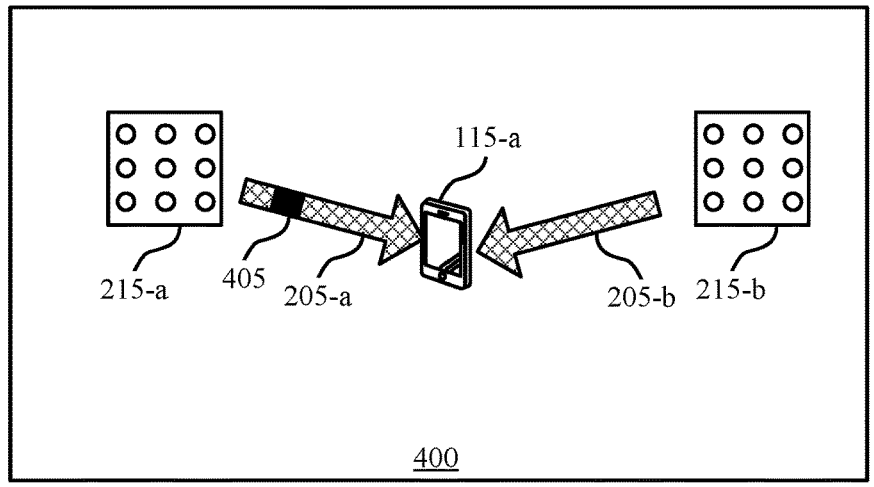
FIGS. 4A-4B illustrate an example of a switching sequence that supports bandwidth part switching for multiple transceiver nodes in accordance with aspects of the present disclosure.
Figure 4B:
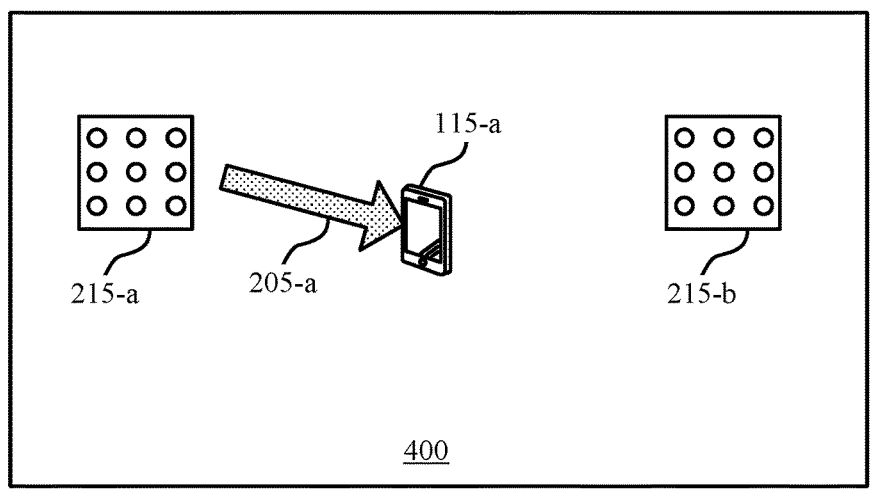

FIGS. 4A-4B illustrate an example of a wireless communication system 400 that supports bandwidth part switching for multiple transceiver nodes in accordance with aspects of the present disclosure. In some examples, wireless communication system 400 may implement aspects of wireless communication system 100. In some examples, FIG. 4A illustrates wireless communication system 400 before BWP switching, and FIG. 4B illustrates wireless communication system 400 after BWP switching. FIGS. 4A-4B may depict an example of BWP switching using a single control message (e.g., a single PDCCH).

As in the example of FIGS. 3A-3B, transceiver node 215-*a* may be associated with a set of downlink BWP identifiers that includes BWP identifiers 0, 1, and 2. Transceiver node 215-*b* may be associated with a set of downlink BWP identifiers that includes BWP identifiers 1, 2, and 3. As depicted in FIG. 4A, UE 115-*a* may initially be configured to monitor downlink connections 205 from both transceiver nodes 215 by monitoring BWP 1.

In this example, UE 115-*a* receives a control message 405 from transceiver node 215-*a* on BWP 1. The control message 405 may include an indication of a new downlink BWP, BWP 0. In response to receiving the control message, UE 115-*a* may determine whether BWP 0 is associated with transceiver node 215-*a* and/or transceiver node 215-*b*. In this example, the UE 115-*a* may determine that BWP 0 is associated with transceiver node 215-*a* but is not associated with transceiver node 215-*b*.

In some cases, based on the control message and on a determination that BWP 0 is associated with transceiver node 215-*a*, UE 115-*a* may switch the active downlink BWP for transceiver node 215-*a* from BWP 1 to BWP 0. Thus, UE 115-*a* may subsequently communicate with (e.g., receive signals from) transceiver node 215-*a* on BWP 0.

In some cases, based on the control message 405 and on a determination that BWP 0 is not associated with transceiver node 215-*b*, UE 115-*a* may not switch the active downlink BWP for transceiver node 215-*b* from BWP 1 to BWP 0. In some cases, UE 115-*a* may refrain from monitoring BWP 0 for downlink transmissions from transceiver node 215-*b*, and/or may refrain from communicating with transceiver node 215-*b* on BWP 0. In some cases, UE 115-*a* may not communicate with transceiver node 215-*b* after receiving control message 405. In this case, transceiver node 215-*b* may be considered as inactive, as depicted in FIG. 4B.

Figure 5A:
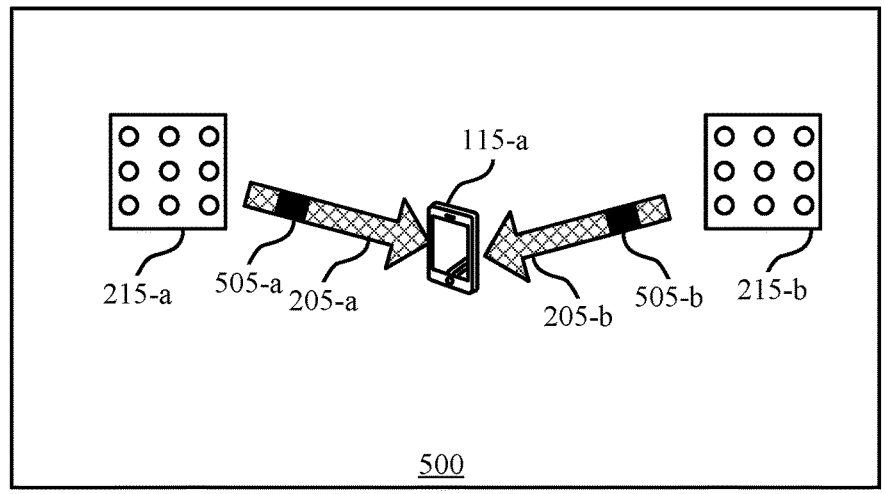
FIGS. 5A-5B illustrate an example of a switching sequence that supports bandwidth part switching for multiple transceiver nodes in accordance with aspects of the present disclosure.
Figure 5B:
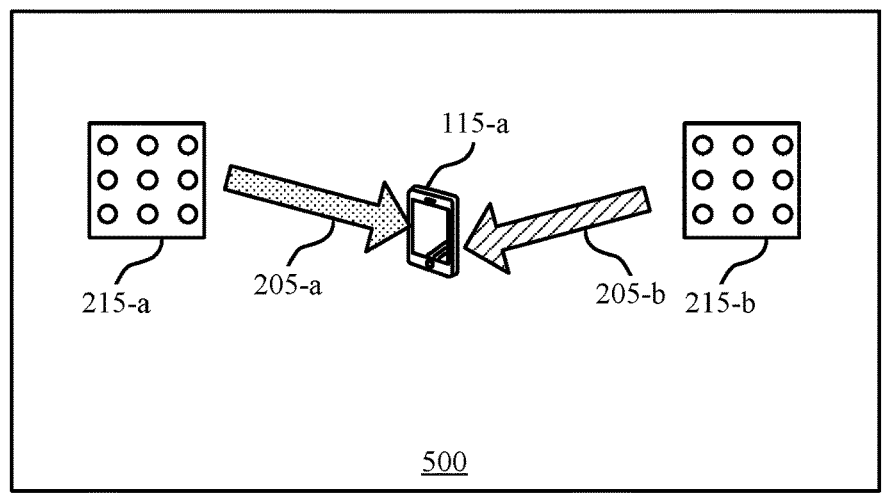

FIGS. 5A-5B illustrate an example of a wireless communication system 500 that supports bandwidth part switching for multiple transceiver nodes in accordance with aspects of the present disclosure. In some examples, wireless communication system 500 may implement aspects of wireless communication system 100. In some examples, FIG. 5A illustrates wireless communication system 500 before BWP switching, and FIG. 5B illustrates wireless communication system 500 after BWP switching. FIGS. 5A-5B may depict an example of BWP switching using multiple separate control messages (e.g., multiple separate PDCCHs).

As in the example of FIGS. 3A-3B, transceiver node 215-*a* may be associated with a set of downlink BWP identifiers that includes BWP identifiers 0, 1, and 2. Transceiver node 215-*b* may be associated with a set of downlink BWP identifiers that includes BWP identifiers 1, 2, and 3. As depicted in FIG. 5A, UE 115-*a* may initially be configured to monitor downlink connections 205 from both transceiver nodes 215 by monitoring BWP 1.

In this example, UE 115-*a* receives a first control message **505-*a*** from transceiver node 215-*a* on BWP 1. The first control message **505-*a* may include an indication of a new downlink BWP, BWP 0**. In response to receiving the first control message, UE 115-*a* may determine whether BWP 0 is associated with transceiver node 215-*a*. In this example, the UE 115-*a* may determine that BWP 0 is associated with transceiver node 215-*a*. In some cases, based on the control message and on a determination that BWP 0 is associated with transceiver node 215-*a*, UE 115-*a* may switch the active downlink BWP for transceiver node 215-*a* from BWP 1 to BWP 0. Thus, UE 115-*a* may subsequently communicate with (e.g., receive signals from) transceiver node 215-*a* on BWP 0.

In this example, UE 115-*a* receives a second control message 505-*b* from transceiver node 215-*b* on BWP 1. The second control message 505-*b* may include an indication of a second new downlink BWP, BWP 2. In response to receiving the second control message, UE 115-*a* may determine whether BWP 2 is associated with transceiver node 215-*b*. In this example, the UE 115-*a* may determine that BWP 2 is associated with transceiver node 215-*b*. In some cases, based on the second control message and on a determination that BWP 2 is associated with transceiver node 215-*b*, UE 115-*a* may switch the active downlink BWP for transceiver node 215-*b* from BWP 1 to BWP 2. Thus, UE 115-*a* may subsequently communicate with (e.g., receive signals from) transceiver node 215-*b* on BWP 2.

Figure 9:
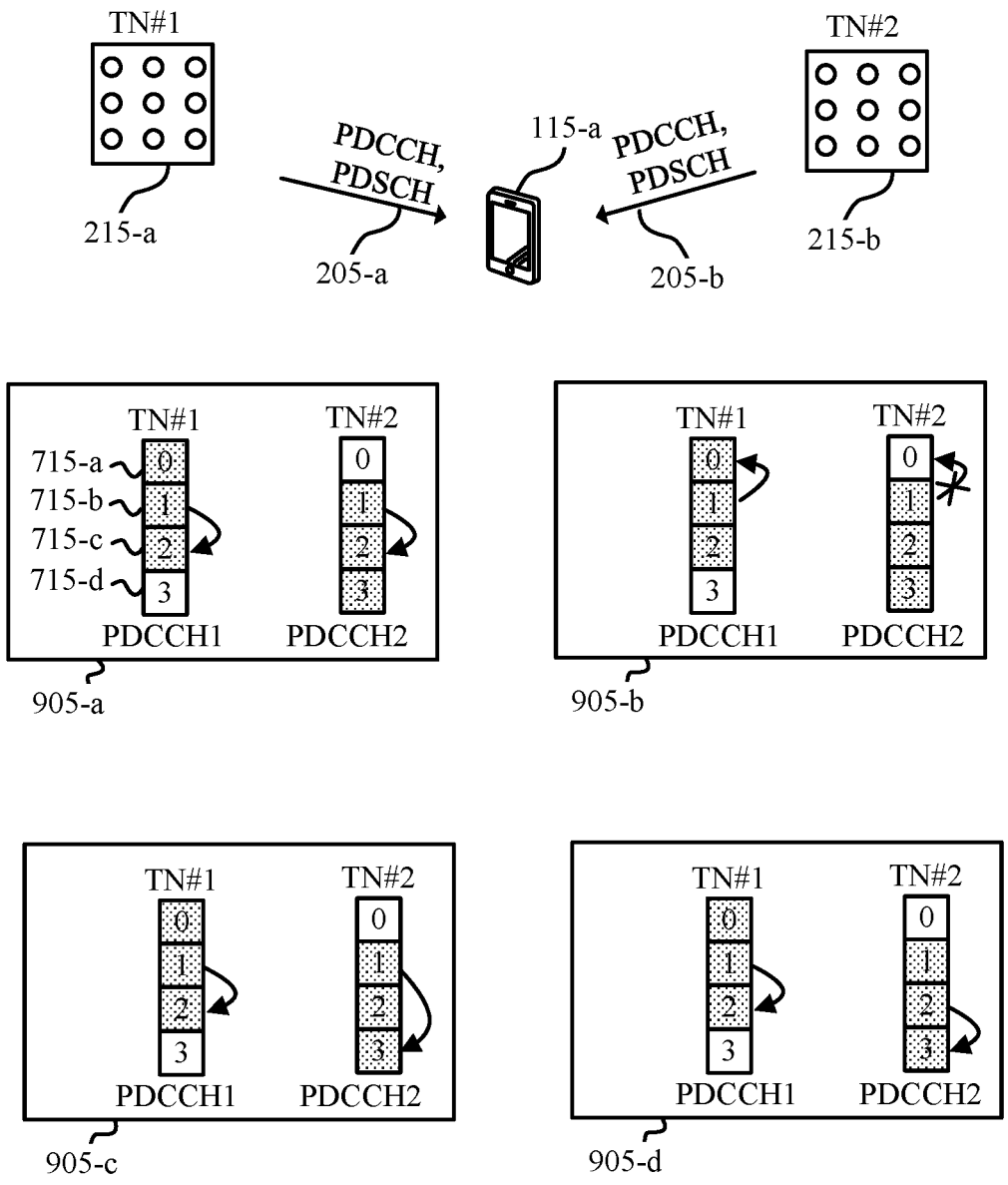
FIG. 9 illustrates examples of switching sequences that support bandwidth part switching for multiple transceiver nodes in accordance with aspects of the present disclosure.

In some cases, if UE 115-*a* determines that a new BWP is not associated with the corresponding transceiver node 215, UE 115-*a* may refrain from communicating with the transceiver node 215 on the new BWP. In some cases, UE 115-*a* may then refrain from communicating with the transceiver node on any BWP, such that the transceiver node becomes inactive. In this case, UE 115-*a* may switch from multi-transceiver node communications to single-transceiver node communications. Alternatively, UE 115-*a* may continue to communicate with the transceiver node on the initial active BWP (in this case, BWP 1), thereby maintaining multi-transceiver node communications. Additional examples of such operation are depicted in FIG. 9.

Figure 6A:
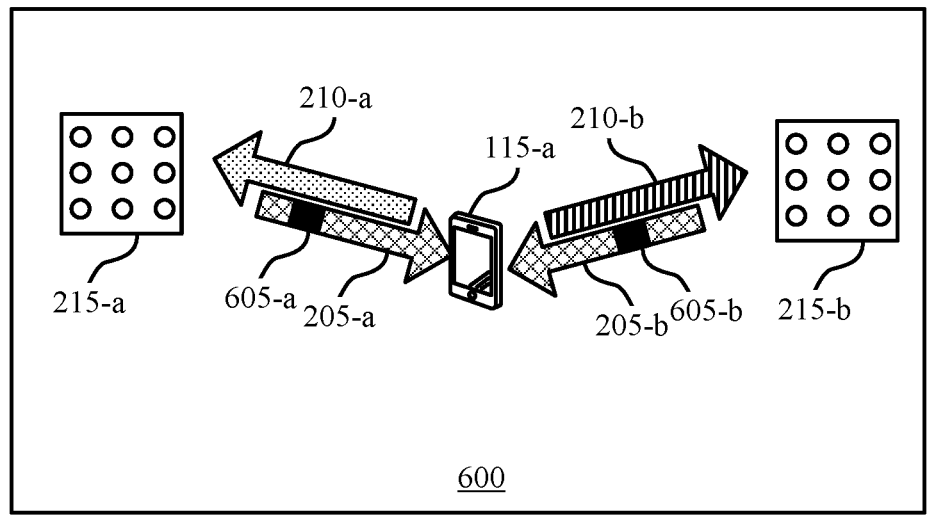
FIGS. 6A-6B illustrate an example of a switching sequence that supports bandwidth part switching for multiple transceiver nodes in accordance with aspects of the present disclosure.
Figure 6B:
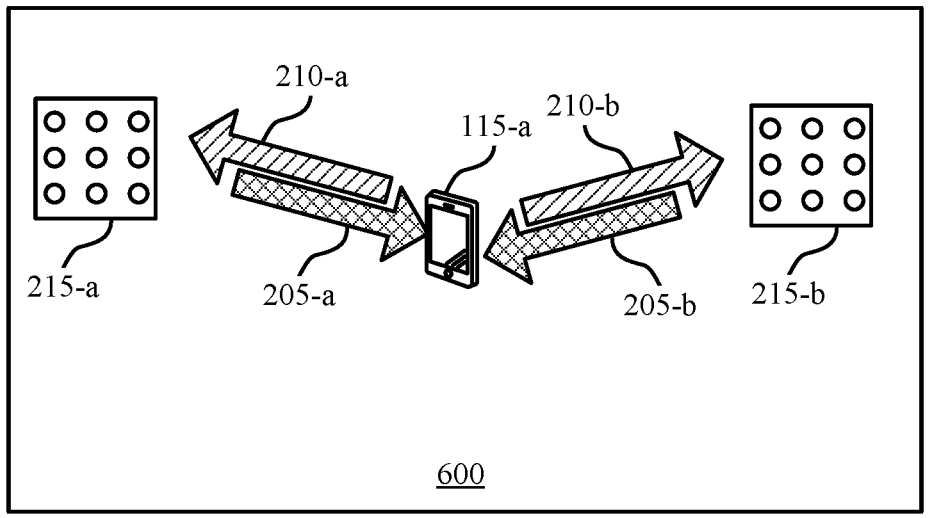

FIGS. 6A-6B illustrate an example of a wireless communication system 600 that supports bandwidth part switching for multiple transceiver nodes in accordance with aspects of the present disclosure. In some examples, wireless communication system 600 may implement aspects of wireless communication system 100. In some examples, FIG. 6A illustrates wireless communication system 600 before BWP switching, and FIG. 6B illustrates wireless communication system 600 after BWP switching. FIGS. 6A-6B may depict an example of BWP switching using multiple separate control messages (e.g., multiple separate PDCCHs). FIGS. 6A-6B depict an example of switching uplink BWPs for transceiver node 215-*a* and transceiver node 215-*b*.

In this example, transceiver node 215-*a* may be associated with a set of downlink BWP identifiers and a set of uplink BWP identifiers, both of which include BWP identifiers 0, 1, and 2. Transceiver node 215-*b* may be associated with a set of downlink BWP identifiers and a set of uplink BWP identifiers, both of which include BWP identifiers 1, 2, and 3. As depicted in FIG. 6A, UE 115-*a* may initially be configured to monitor downlink connections 205 from transceiver nodes 215-*a*, 215-*b* by monitoring BWP 1. UE 115-*a* may receive signals (e.g., PDCCH and/or PDSCH transmissions, including control messages) from transceiver nodes 215-*a*, 215-*b* on BWP 1.

UE 115-*a* may initially be configured to transmit signals (e.g., PUCCH or PUSCH) on uplink connects 210 to transceiver nodes 215-*a* on BWP 0, and to transceiver node 215-*b* on BWP 3. In this example, UE 115-*a* receives a first control message 605-*a* from transceiver node 215-*a* on BWP 1. The first control message 605-*a* may include an indication of a new uplink BWP, BWP 2.

In response to receiving the first control message, UE 115-*a* may determine whether uplink BWP 2 is associated with transceiver node 215-*a*; e.g., whether BWP 2 is included in the set of uplink BWP identifiers for transceiver node 215-*a*. In this example, the UE 115-*a* may determine that BWP 2 is associated with transceiver node 215-*a* because BWP 2 is included in the set of uplink BWP identifiers. In some cases, based on the first control message and on a determination that BWP 2 is associated with transceiver node 215-*a*, UE 115-*a* may switch the active uplink BWP for transceiver node 215-*a* from BWP 0 to BWP 2. Thus, UE 115-*a* may subsequently transmit signals to transceiver node 215-*a* on BWP 0.

In this example, UE 115-*a* receives a second control message 605-*b* from transceiver node 215-*b* on BWP 1. The second control message 605-*b* may include an indication of a new uplink, BWP 2. In response to receiving the second control message, UE 115-*a* may determine whether uplink BWP 2 is associated with transceiver node 215-*b*; e.g., whether BWP 2 is included in the set of uplink BWP identifiers for transceiver node 215-*b*. UE 115-*a* may determine that BWP 2 is associated with transceiver node 215-*b* because BWP 2 is included in the set of uplink BWP identifiers for transceiver node 215-*b*. In some cases, based on the second control message and on a determination that BWP 2 is associated with transceiver node 215-*b*, UE 115-*a* may switch the active uplink BWP for transceiver node 215-*b* from BWP 3 to BWP 2. Thus, UE 115-*a* may subsequently transmit signals to transceiver node 215-*b* on BWP 2.

Figure 7:
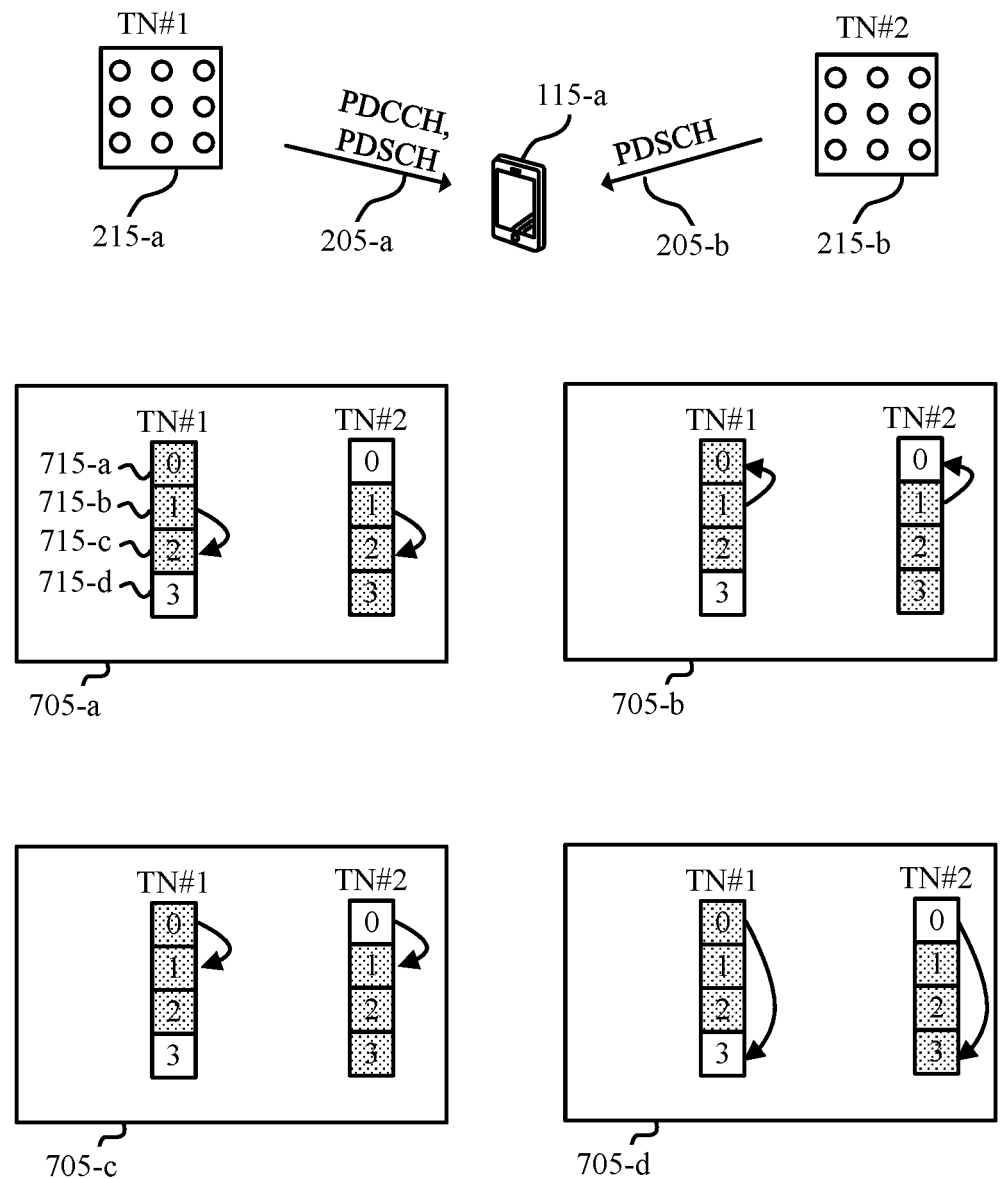
FIG. 7 illustrates examples of switching sequences that support bandwidth part switching for multiple transceiver nodes in accordance with aspects of the present disclosure.

FIG. 7 illustrates example sequences of bandwidth part switching for multiple transceiver nodes using a single control message (e.g., a single PDCCH). For single PDCCH operation, both transceiver nodes may use the same uplink and downlink BWPs.

Each example BWP switching sequence 705 depicts an initially active BWP (which may be an uplink or downlink BWP) and a new BWP (which may be an uplink or a downlink BWP). These examples may depict switching of either an uplink BWP or a downlink BWP.

In these examples, transceiver node 215-*a* is associated with BWP 0 715-*a*, BWP 1 715-*b*, and BWP 2 715-*c*. Transceiver node 215-*a* is not associated with BWP 3 715-*d*.

In these examples, transceiver node 215-*b* is associated with BWP 1 715-*b*, BWP 2 715-*c*, and BWP 3 715-*d*. Transceiver node 215-*b* is not associated with BWP 0 715-*a*.

In example switching sequence 705-*a*, transceiver node 215-*a* and transceiver node 215-*b* are both initially active on BWP 1 715-*a*. UE receives a control message indicating a new BWP of BWP 2 715-*c*. UE 115-*a* may determine whether transceiver node 215-*a* and/or transceiver node 215-*b* are associated with BWP 2; e.g., whether BWP 2 is included in the respective sets of BWP identifiers (e.g., the set of uplink BWP identifiers for an uplink switch, or the set of downlink BWP identifiers for a downlink switch) associated with transceiver node 215-*a* and 215-*b*. Based on a determination that transceiver node 215-*a* and transceiver node 215-*b* are associated with BWP 2, UE 115-*a* may switch transceiver node 215-*a* and transceiver node 215-*b* from BWP 1 to BWP 2. Thus, transceiver node 215-*a* and transceiver node 215-*b* may both be active before and after the BWP switch.

In example switching sequence 705-*b*, transceiver node 215-*a* and transceiver node 215-*b* are both initially active on BWP 1. UE 115-*a* receives a control message indicating a new BWP of BWP 0. UE 115-*a* may determine whether transceiver node 215-*a* and transceiver node 215-*b* are associated with BWP 0. Based on a determination that transceiver node **215-*a* is associated with BWP 0, UE 115-*a* may switch transceiver node 215-*a* from BWP 1 to BWP 0. Based on a determination that transceiver node 215-*b* is not associated with BWP 0, UE 115-*a* may not switch transceiver node 215-*b* from BWP 1 to BWP 0. UE 115-*a* may, after receiving the control message, refrain from communicating with transceiver node 215-*b* on BWP 0. In this case, transceiver node 215-*b* may become inactive. Thus, transceiver node 215-*a* and transceiver node 215-*b* may both be active before the BWP switch, transceiver node 215-*a* may be active after the BWP switch, and transceiver node 215-*b*** may be inactive after the BWP switch. Such a sequence may trigger a switch from multi-transceiver node operation to single-transceiver node operation.

In example switching sequence **705-*c*, transceiver node 215-*a* is initially active on BWP 0, and transceiver node 215-*b* may be initially inactive since it is not associated with BWP 0. UE 115-*a* receives a control message from transceiver node 215-*a* indicating a new BWP of BWP 1. UE 115-*a* may determine whether transceiver node 215-*a* and transceiver node 215-*b* are associated with BWP 1. Based on a determination that transceiver node 215-*a* is associated with BWP 1, UE may switch transceiver node 215-*a* from BWP 0 to BWP 1. Based on a determination that transceiver node 215-*b* is associated with BWP 1, UE may switch transceiver node 215-*b* from BWP 0 to BWP 1, thus activating transceiver node 215-*b* on BWP 1. Thus, transceiver node 215-*a* is active before the BWP switch, and both transceiver node 215-*a* and transceiver node 215-*b*** are active after the BWP switch. Such a sequence may trigger a switch from single-transceiver node operation to multi-transceiver node operation.

In example switching sequence **705-*d*, transceiver node 215-*a* is initially active on BWP 0, and transceiver node 215-*b* is initially inactive since it is not associated with BWP 0. UE receives a control message indicating a new BWP of BWP 3. UE 115-*a* may determine whether transceiver node 215-*a* and transceiver node 215-*b* are associated with BWP 3. Based on a determination that transceiver node 215-*a* is not associated with BWP 3, UE may not switch transceiver node 215-*a* from BWP 0 to BWP 3. UE 115-*a* may refrain from communicating with transceiver node 215-*a* on BWP 3. Based on a determination that transceiver node 215-*b* is associated with BWP 3, UE may switch transceiver node 215-*b* from BWP 0 to BWP 3, thus activating transceiver node 215-*b* on BWP 3. Thus, transceiver node 215-*a* is active before the BWP switch, and transceiver node 215-*b* is active after the BWP switch. Such a switching sequence may trigger a switch from single-transceiver node operation on transceiver node 215-*a* to single-transceiver node operation on transceiver node 215-*b***.

In some cases, more flexible switching can be enabled if the control message includes an indication (such as a one-bit indicator), for each transceiver node, that indicates whether the new BWP is active for the transceiver node after switching; e.g., to indicate whether the UE should communicate with each transceiver node on the new BWP.

Figure 8:
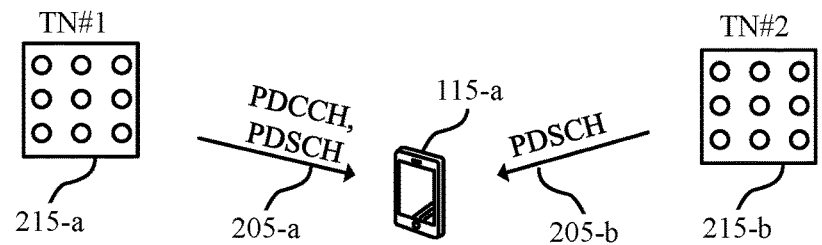
FIG. 8 illustrates examples of switching sequences that support bandwidth part switching for multiple transceiver nodes in accordance with aspects of the present disclosure.
Figure 8:
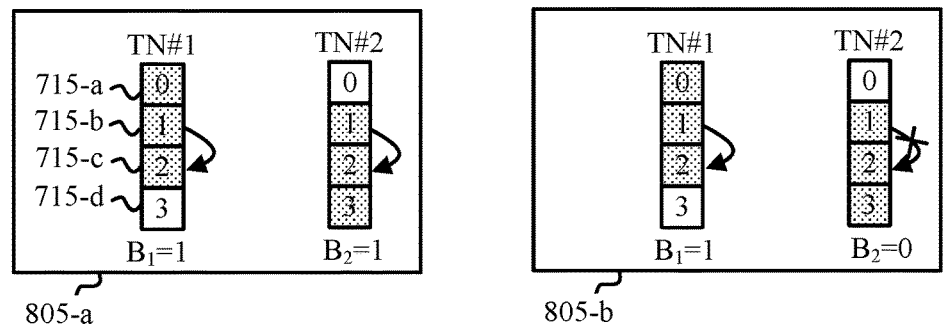
Figure 8:
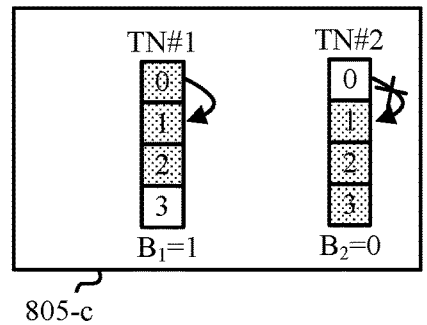
Figure 8:
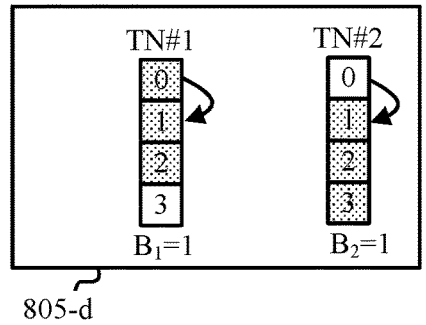
Figure 8:
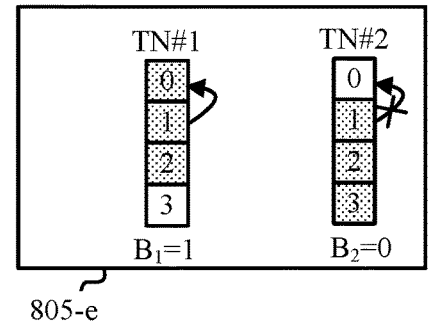
Figure 8:
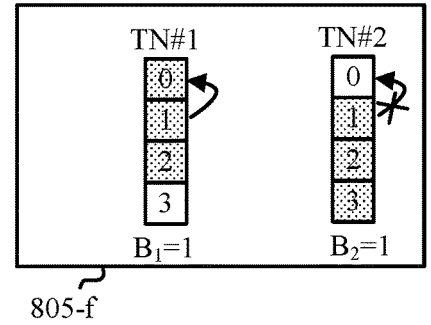

FIG. 8 illustrates examples of bandwidth part switching for multiple transceiver nodes using a single control message (e.g., PDCCH) that includes an indication, for each transceiver node, of whether the UE should communicate with the respective transceiver node on the new BWP.

As discussed with reference to FIG. 7, in these examples, transceiver node **215-*a* is associated with BWP 0 715-*a*, BWP 1 715-*b*, and BWP 2 715-*c*. Transceiver node 215-*a* is not associated with BWP 3 715-*d*. Transceiver node 215-*b* is associated with BWP 1 715-*b*, BWP 2 715-*c*, and BWP 3 715-*d*. Transceiver node 215-*b* is not associated with BWP 0 715-*a***.

In these examples, two bits ($B_1$ and $B_2$, one for each transceiver node) may be added to the control message (e.g., the bits may be added to the DCI) to indicate whether the UE should communicate with each transceiver node on the new BWP. In this example, a value of "1" indicates that the UE should communicate with the transceiver node on the new BWP and a value of "0" indicates that the UE should not communicate with the transceiver node on the new BWP. In other examples, different values or indicators may be used to indicate whether a UE should communicate with a transceiver node on a new BWP.

In some cases, if a UE determines that the new BWP is associated with a transceiver node and that the UE should communicate with the transceiver node on the BWP (e.g., by determining that the value of the indicator is a "1"), then the UE may communicate with the transceiver on the new BWP.

For example, in switching sequence **805-*a*, the UE 115-*a* may determine that both transceiver nodes 215-*a*, 215-*b* are associated with the new BWP (BWP 2), and that the UE 115-*a* should communicate with both transceiver nodes 215 on BWP 2 (e.g., based on the values of $B_1$ and $B_2$). Thus, after receiving the control message indicating BWP 2, UE may communicate with transceiver nodes 215-*a*, 215-*b* on BWP 2**. Thus, in this case, the UE may communicate with multiple transceiver nodes both before and after the BWP switch.

In some cases, if the UE determines that the new BWP is associated with the transceiver node but the UE determines that the UE should not communicate with the transceiver node on the new BWP (e.g., by determining that the corresponding bit indicates that the UE should not communicate with the transceiver node on the new BWP), the UE may refrain from communicating with the transceiver node on the new BWP.

For example, in switching sequence **805-*b*, which indicates a new BWP of BWP 2, the UE may refrain from communicating with transceiver node 215-*b* on BWP 2 even though BWP 2 is associated with transceiver node 215-*b* because the corresponding bit ($B_2$) is set to 0 to indicate that the UE should not communicate with transceiver node 215-*b* on BWP 2**. In this case, the UE may communicate with multiple transceiver nodes before the BWP switch, and with a single transceiver node after the BWP switch.

Switching sequence **805-*c* is similar to switching sequence 805-*b*, with transceiver node 215-*b* remaining inactive after the switch because $B_2=0$. In switching sequence 805-*d*, transceiver node 215-*b* switches to BWP 1 and becomes active on BWP 1** because $B_2=1$ In some cases, if the new BWP is not associated with a transceiver node (e.g., if the control message includes a bandwidth identifier for a new BWP that is not included in the set of BWP identifiers for the transceiver node) then the value of the corresponding bit (e.g., $B_1$ or $B_2$) may be ignored, and the transceiver node may become deactivated (e.g., may be inactive).

For example, in switching sequences **805-*e* and 805-*f*, UE 115-*a* may refrain from communicating with transceiver node 215-*b* on BWP 0 because BWP 0 is not associated with transceiver node 215-*b*. In this case, UE 115-*a* may refrain from communicating with transceiver node 215-*b* on BWP 0 even though the corresponding bit ($B_2$) is set to 1 to indicate that the UE should communicate with transceiver node 215-*b* on BWP 0; the UE essentially ignores $B_2$. Thus, in switching sequences 805-*e* and 805-*f*, it may not matter whether $B_2$ is set to 0 or 1; the control message indicating BWP 0 may trigger a change from multi-transceiver node operation to single-transceiver node operation in both cases because the new BWP 0 is not associated with (e.g., available to) transceiver node 215**-*b*.

Thus, in some cases, in response to receiving a control message indicating a new BWP, a UE may communicate with a transceiver node on the new BWP if the new BWP is associated with the transceiver node and the corresponding indicator for the transceiver node indicates that the UE should communicate with the transceiver node on the new BWP.

FIG. 9 illustrates examples of bandwidth part switching for multiple transceiver nodes using multiple separate control messages (e.g., multiple PDCCH). In this case, UE 115-*a* may receive separate control messages from transceiver nodes 215-*a*, 215-*b*, with each control message indicating a new BWP for transceiver node 215-*a*, 215-*b*. Thus, in this case, the BWP switching may be independently controlled for transceiver nodes 215-*a* and 215-*b*, which may be switched from the same or different BWPs to the same or different BWPs.

In these examples, transceiver node 215-*a* is associated with BWP 0 715-*a*, BWP 1 715-*b*, and BWP 2 715-*c*. Transceiver node 215-*a* is not associated with BWP 3 715-*d*.

In these examples, transceiver node 215-*b* is associated with BWP 1 715-*b*, BWP 2 715-*c*, and BWP 3 715-*d*. Transceiver node 215-*b* is not associated with BWP 0 715-*a*.

In example switching sequence 905-*a*, UE 115-*a* may receive a first control message from transceiver node 215-*a* indicating a new BWP of BWP 2, and a second control message from transceiver node 215-*b* also indicating a new BWP of BWP 2. In this case, UE 115-*a* may determine whether BWP 2 is associated with transceiver node 215-*a* and transceiver node 215-*b* and may communicate with transceiver node 215-*a* and transceiver node 215-*b* based on a determination that both transceiver nodes are associated with BWP 2.

In example switching sequence 905-*b*, UE 115-*a* may receive a first control message from transceiver node 215-*a* indicating a new BWP of BWP 0, and a second control message from transceiver node 215-*b* also indicating a new BWP of BWP 0. UE 115-*a* may determine whether BWP 0 is associated with transceiver node 215-*a* and transceiver node 215-*b* and may communicate with transceiver node 215-*a* based on a determination that both transceiver nodes 215-*a* are associated with BWP 2. UE 115-*a* may refrain from communicating with transceiver node 215-*b* based on a determination that BWP 0 is not associated with transceiver node 215-*b*. In this case, transceiver node 215-*b* may become inactive (e.g., UE 115-*a* may refrain from communicating with transceiver node 215-*b* on any BWP), or UE 115-*a* may continue to communicate with transceiver node 215-*b* on BWP 1 (e.g., on the BWP that was active before the second control message was received).

Example switching sequence 900-*c* depicts an example in which transceiver nodes 215-*a* and 215-*b* are initially active on the same BWP (BWP 1) and are switched to different BWPs (BWP 2 and BWP 3, respectively).

Example switching sequence 900-*d* depicts an example in which transceiver nodes 215-*a*, 215-*b* are initially active on different BWPs (BWP 1 and BWP 2, respectively) and are switched to different BWPs (BWP2 and BWP 3, respectively).

Figure 10:
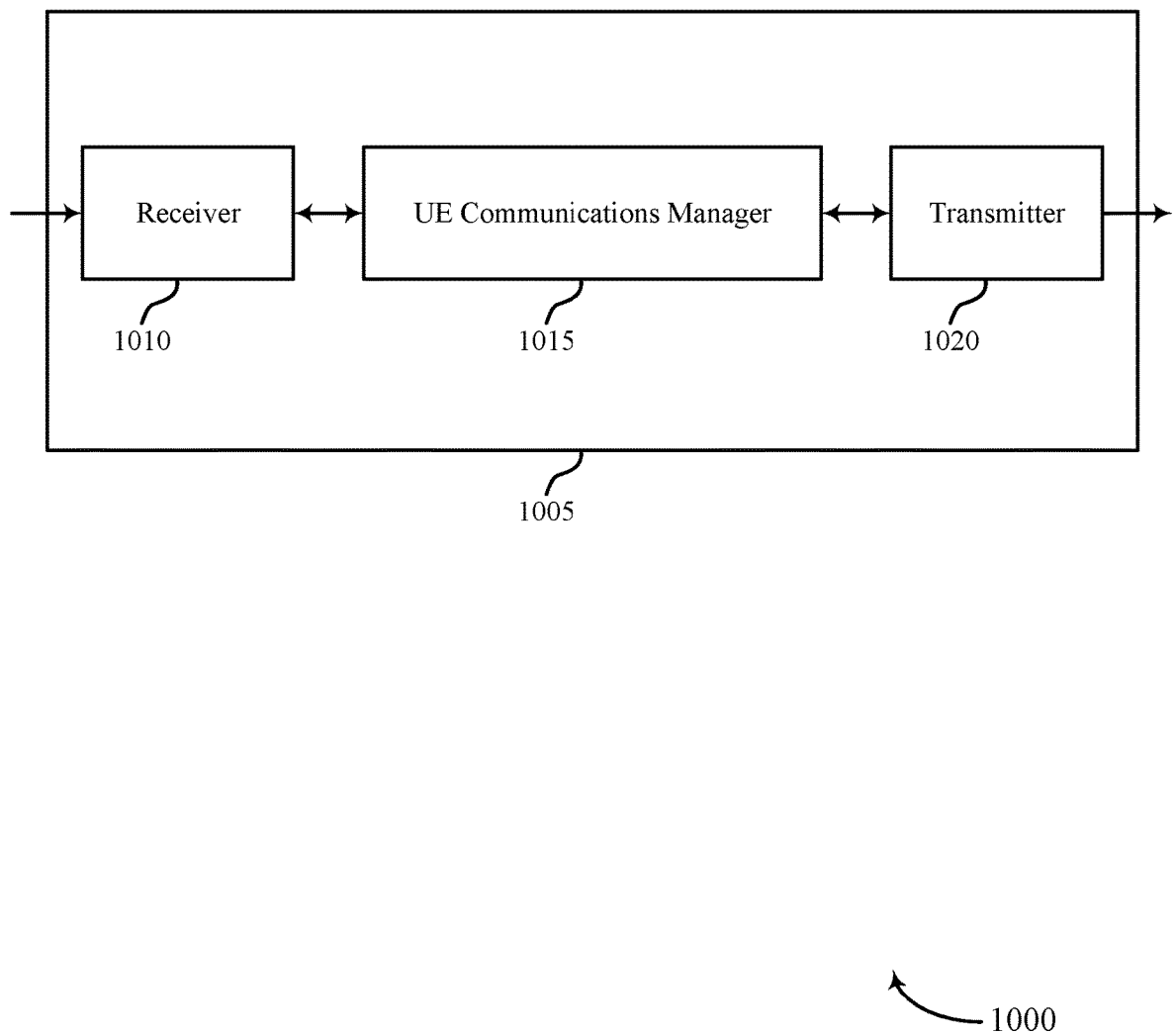
FIGS. 10 and 11 show block diagrams of devices that support bandwidth part switching for multiple transceiver nodes in accordance with aspects of the present disclosure.

FIG. 10 shows a block diagram 1000 of a device 1005 that supports bandwidth part switching for multiple transceiver nodes in accordance with aspects of the present disclosure.

The device 1005 may be an example of aspects of a UE 115-*a* as described herein. The device 1005 may include a receiver 1010, a UE communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to bandwidth part switching for multiple transceiver nodes, etc.). Information may be passed on to other components of the device 1005. The receiver 1010 may be an example of aspects of the transceiver 1320 described with reference to FIG. 13. The receiver 1010 may utilize a single antenna or a set of antennas.

The UE communications manager 1015 may monitor a first bandwidth part for communications from one or more transceiver nodes, receive a control message on the first bandwidth part from a first transceiver node of the one or more transceiver nodes, where the control message includes an indication of a second bandwidth part different from the first bandwidth part, determine whether the second bandwidth part is associated with each of the one or more transceiver nodes, communicate with at least a second transceiver node of the one or more transceiver nodes on the second bandwidth part based on the control message and on a determination that the second bandwidth part is associated with the second transceiver node, receive a first control message on a first bandwidth part from a first transceiver node, where the first control message includes an indication of a second bandwidth part different from the first bandwidth part, receive a second control message on a third bandwidth part from a second transceiver node, where the second control message includes an indication of a fourth bandwidth part different from the third bandwidth part, determine whether the second bandwidth part is associated with the first transceiver node, and communicate with the first transceiver node on the second bandwidth part based on the control message and on a determination that the second bandwidth part is associated with the first transceiver node.

The UE communications manager 1015 may receive a first control message on a first bandwidth part from a first transceiver node, where the first control message includes an indication of a second bandwidth part different from the first bandwidth part. The UE communications manager 1015 may receive a second control message on a third bandwidth part from a second transceiver node, where the second control message comprises an indication of a fourth bandwidth part different from the third bandwidth part. The UE communications manager 1015 may determine whether the second bandwidth part is associated with the first transceiver node. The UE communications manager 1015 may communicate with the first transceiver node on the second bandwidth part based at least in part on the first control message and on a determination that the second bandwidth part is associated with the first transceiver node.

The UE communications manager 1015 may be an example of aspects of the UE communications manager 1310 described herein. The UE communications manager 1015, or its sub-components, may be implemented in hardware, code (e.g., software or firmware) executed by a processor, or any combination thereof. If implemented in code executed by a processor, the functions of the UE communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 1015, or its sub-components, may be physically located at various positions, including being distributed such that portions of functions are implemented at different physical locations by one or more physical components. In some examples, the UE communications manager 1015, or its sub-components, may be a separate and distinct component in accordance with various aspects of the present disclosure. In some examples, the UE communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
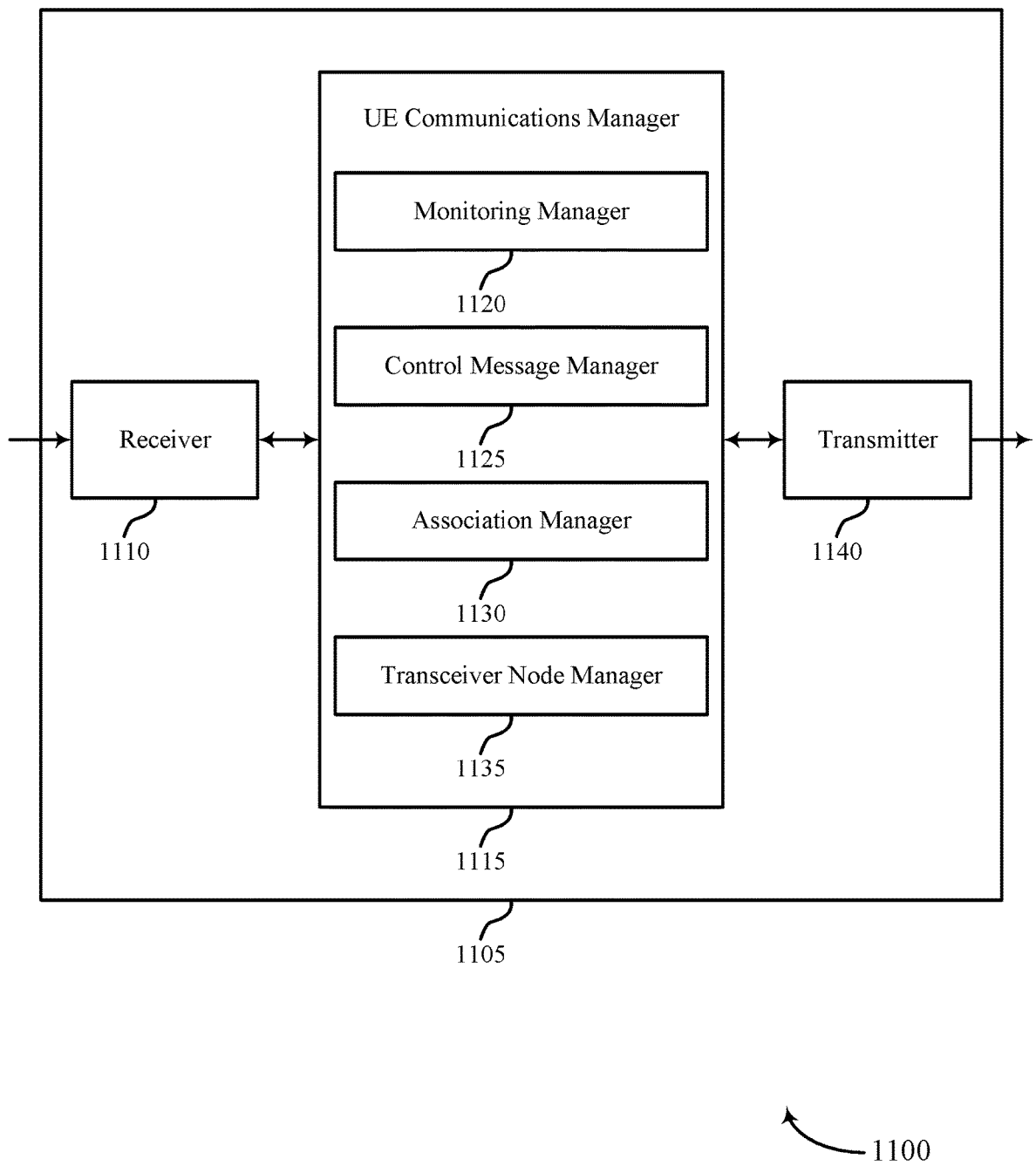

FIG. 11 shows a block diagram 1100 of a device 1105 that supports bandwidth part switching for multiple transceiver nodes in accordance with aspects of the present disclosure. The device 1105 may be an example of aspects of a device 1005 or a UE 115-a as described herein. The device 1105 may include a receiver 1110, a UE communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to bandwidth part switching for multiple transceiver nodes, etc.). Information may be passed on to other components of the device 1105. The receiver 1110 may be an example of aspects of the transceiver 1320 described with reference to FIG. 13. The receiver 1110 may utilize a single antenna or a set of antennas.

The UE communications manager 1115 may be an example of aspects of the UE communications manager 1015 as described herein. The UE communications manager 1115 may include a monitoring manager 1120, a control message manager 1125, an association manager 1130, and a transceiver node manager 1135. The UE communications manager 1115 may be an example of aspects of the UE communications manager 1310 described herein.

The monitoring manager 1120 may monitor a first bandwidth part for communications from one or more transceiver nodes. The control message manager 1125 may receive a control message on the first bandwidth part from a first transceiver node of the one or more transceiver nodes, where the control message includes an indication of a second bandwidth part different from the first bandwidth part.

The association manager 1130 may determine whether the second bandwidth part is associated with each of the one or more transceiver nodes. The transceiver node manager 1135 may communicate with at least a second transceiver node of the one or more transceiver nodes on the second bandwidth part based on the control message and on a determination that the second bandwidth part is associated with the second transceiver node.

The control message manager 1125 may receive a first control message on a first bandwidth part from a first transceiver node, where the first control message includes an indication of a second bandwidth part different from the first bandwidth part and receive a second control message on a third bandwidth part from a second transceiver node, where the second control message includes an indication of a fourth bandwidth part different from the third bandwidth part.

The association manager 1130 may determine whether the second bandwidth part is associated with the first transceiver node. The transceiver node manager 1135 may communicate with the first transceiver node on the second bandwidth part based on the first control message and on a determination that the second bandwidth part is associated with the second transceiver node.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
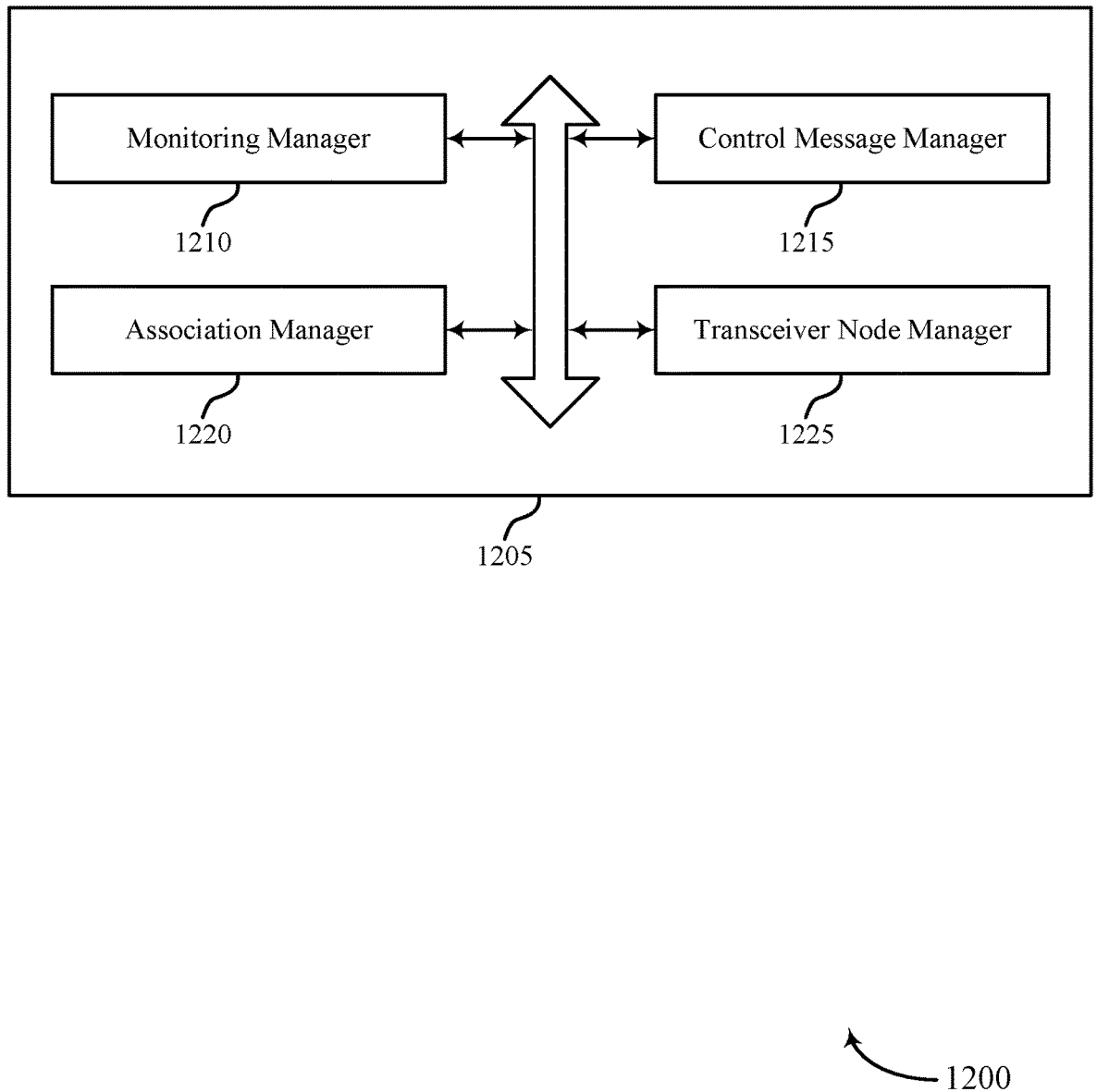
FIG. 12 shows a block diagram of a UE communications manager that supports bandwidth part switching for multiple transceiver nodes in accordance with aspects of the present disclosure.

FIG. 12 shows a block diagram 1200 of a UE communications manager 1205 that supports bandwidth part switching for multiple transceiver nodes in accordance with aspects of the present disclosure. The UE communications manager 1205 may be an example of aspects of a UE communications manager 1015, a UE communications manager 1115, or a UE communications manager 1310 described herein. The UE communications manager 1205 may include a monitoring manager 1210, a control message manager 1215, an association manager 1220, and a transceiver node manager 1225. Each of these modules may communicate, directly or indirectly, with one another (e.g., via one or more buses).

The monitoring manager 1210 may monitor a first bandwidth part for communications from one or more transceiver nodes. The control message manager 1215 may receive a control message on the first bandwidth part from a first transceiver node of the one or more transceiver nodes, where the control message includes an indication of a second bandwidth part different from the first bandwidth part.

In some examples, the first control message includes an indication of a second bandwidth part different from the first bandwidth part. In some examples, control message manager 1215 may receive a second control message on a third bandwidth part from a second transceiver node, where the second control message includes an indication of a fourth bandwidth part different from the third bandwidth part.

The association manager 1220 may determine whether the second bandwidth part is associated with each of the one or more transceiver nodes. In some examples, the association manager 1220 may determine whether the second bandwidth part is associated with the first transceiver node.

The transceiver node manager 1225 may communicate with at least a second transceiver node of the one or more transceiver nodes on the second bandwidth part based on the first control message and on a determination that the second bandwidth part is associated with the second transceiver node.

In some examples, the transceiver node manager 1225 may communicate with the first transceiver node on the second bandwidth part based on the first control message and on a determination that the second bandwidth part is associated with the first transceiver node.

Figure 13:
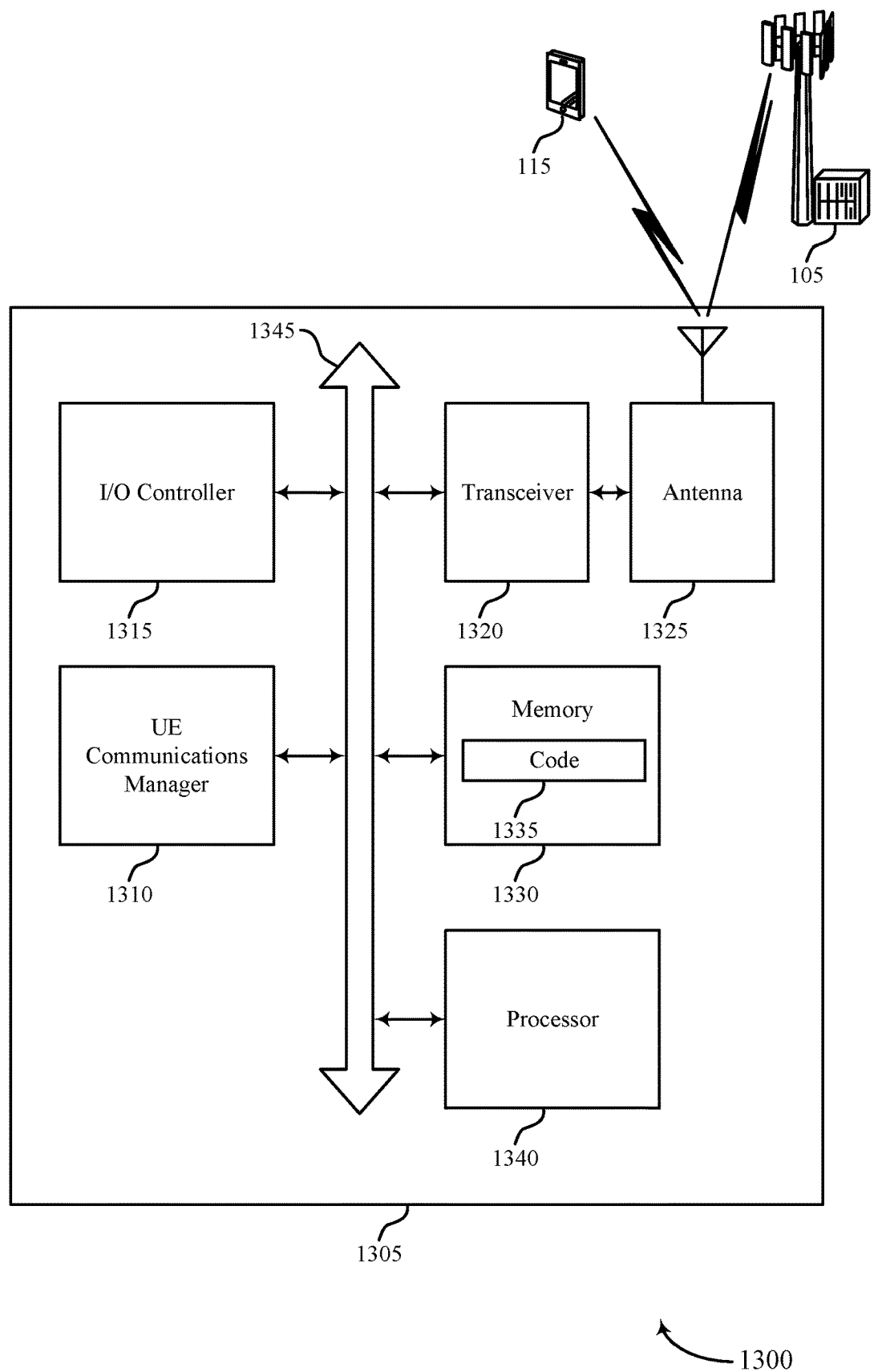
FIG. 13 shows a diagram of a system including a device that supports bandwidth part switching for multiple transceiver nodes in accordance with aspects of the present disclosure.

FIG. 13 shows a diagram of a system 1300 including a device 1305 that supports bandwidth part switching for multiple transceiver nodes in accordance with aspects of the present disclosure. The device 1305 may be an example of or include the components of device 1005, device 1105, or a UE 115-*a* as described herein. The device 1305 may include components for bi-directional voice and data communications including components for transmitting and receiving communications, including a UE communications manager 1310, an I/O controller 1315, a transceiver 1320, an antenna 1325, memory 1330, and a processor 1340. These components may be in electronic communication via one or more buses (e.g., bus 1345).

The UE communications manager 1310 may monitor a first bandwidth part for communications from one or more transceiver nodes, receive a control message on the first bandwidth part from a first transceiver node of the one or more transceiver nodes, where the control message includes an indication of a second bandwidth part different from the first bandwidth part, determine whether the second bandwidth part is associated with each of the one or more transceiver nodes, communicate with at least a second transceiver node of the one or more transceiver nodes on the second bandwidth part based on the control message and on a determination that the second bandwidth part is associated with the second transceiver node, receive a first control message on a first bandwidth part from a first transceiver node, where the first control message includes an indication of a second bandwidth part different from the first bandwidth part, receive a second control message on a third bandwidth part from a second transceiver node, where the second control message includes an indication of a fourth bandwidth part different from the third bandwidth part, determine whether the second bandwidth part is associated with the first transceiver node, and communicate with the first transceiver node on the second bandwidth part based on the first control message and on a determination that the second bandwidth part is associated with the first transceiver node.

The UE communications manager 1310 may receive a first control message on a first bandwidth part from a first transceiver node, where the first control message includes an indication of a second bandwidth part different from the first bandwidth part, receive a second control message on a third bandwidth part from a second transceiver node, where the second control message comprises an indication of a fourth bandwidth part different from the third bandwidth part, determine whether the second bandwidth part is associated with the first transceiver node, and communicate with the first transceiver node on the second bandwidth part based at least in part on the first control message and on a determination that the second bandwidth part is associated with the first transceiver node.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting bandwidth part switching for multiple transceiver nodes).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
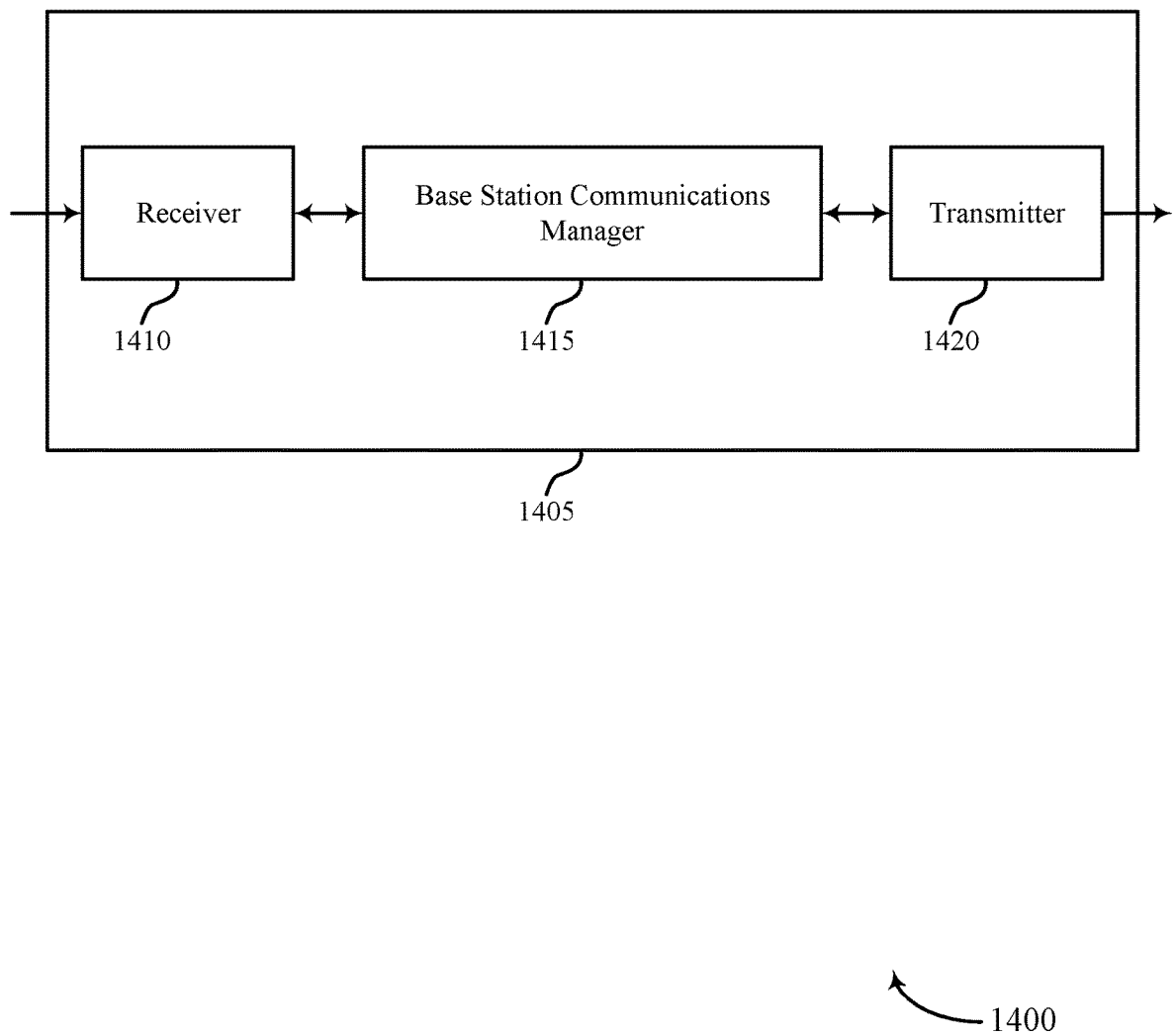
FIGS. 14 and 15 show block diagrams of devices that support bandwidth part switching for multiple transceiver nodes in accordance with aspects of the present disclosure.

FIG. 14 shows a block diagram 1400 of a device 1405 that supports bandwidth part switching for multiple transceiver nodes in accordance with aspects of the present disclosure. The device 1405 may be an example of aspects of a base station 105 as described herein. The device 1405 may include a receiver 1410, a base station communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to bandwidth part switching for multiple transceiver nodes, etc.). Information may be passed on to other components of the device 1405. The receiver 1410 may be an example of aspects of the transceiver 1320 described with reference to FIG. 13. The receiver 1410 may utilize a single antenna or a set of antennas.

The base station communications manager 1415 may transmit, to a device, configuration information indicating that a first bandwidth part is associated with a first transceiver node and a second bandwidth part is associated with a second transceiver node, determine that a network condition has been met, select, based on the determination that the network condition has been met, a third bandwidth part to be associated with the first transceiver node, the third bandwidth part different from the first bandwidth part, and initiate a control message to be transmitted to the device from the first transceiver node on the first bandwidth part, where the control message includes an indication of the third bandwidth part. The base station communications manager 1415 may be an example of aspects of the base station communications manager 1605 described herein.

The base station communications manager 1415, or its sub-components, may be implemented in hardware, code (e.g., software or firmware) executed by a processor, or any combination thereof. If implemented in code executed by a processor, the functions of the base station communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1415, or its sub-components, may be physically located at various positions, including being distributed such that portions of functions are implemented at different physical locations by one or more physical components. In some examples, the base station communications manager 1415, or its sub-components, may be a separate and distinct component in accordance with various aspects of the present disclosure. In some examples, the base station communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
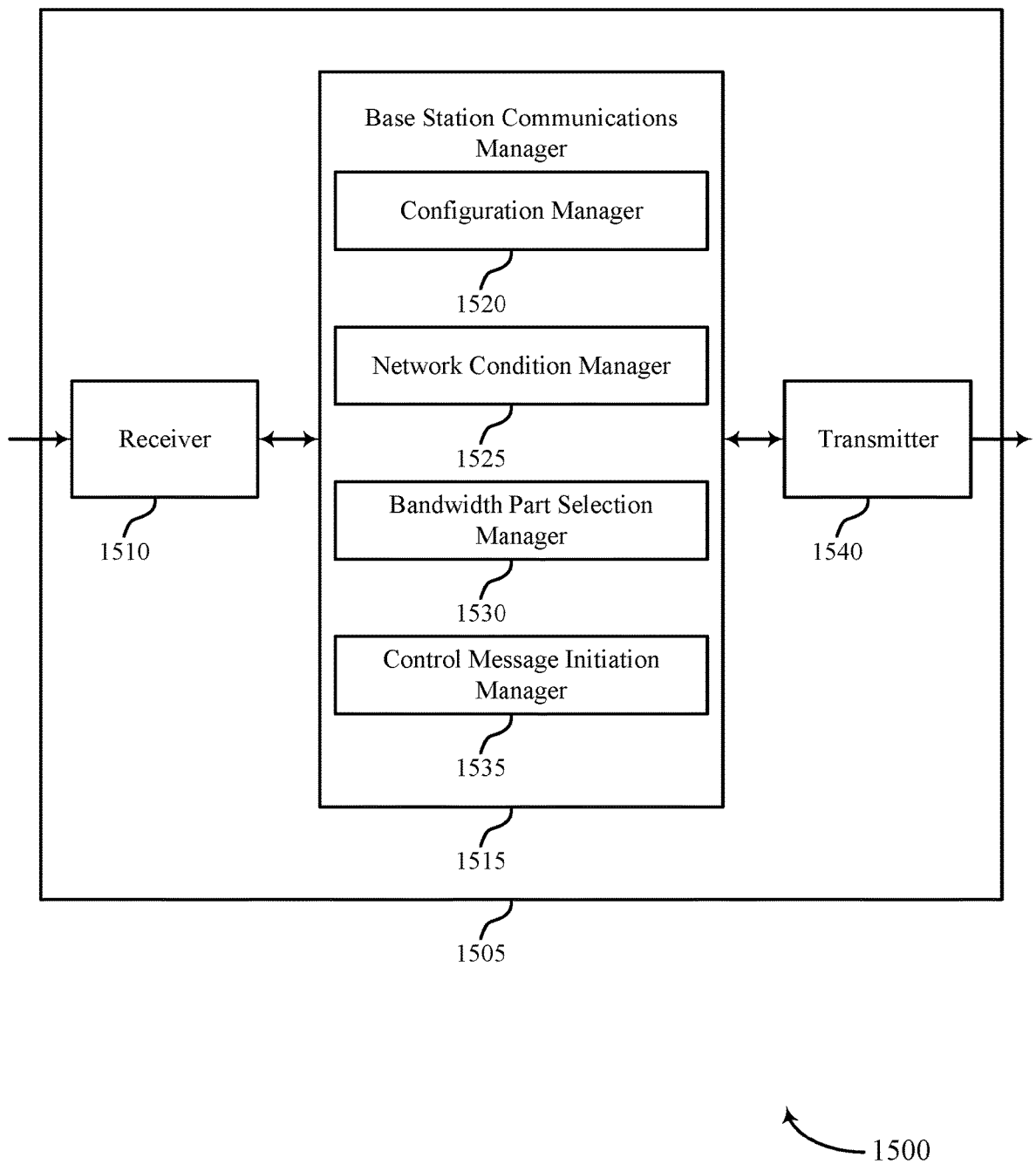

FIG. 15 shows a block diagram 1500 of a device 1505 that supports bandwidth part switching for multiple transceiver nodes in accordance with aspects of the present disclosure. The device 1505 may be an example of aspects of a device 1405 or a base station 105 as described herein. The device 1505 may include a receiver 1510, a base station communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to bandwidth part switching for multiple transceiver nodes, etc.). Information may be passed on to other components of the device 1505. The receiver 1510 may be an example of aspects of the transceiver 1720 described with reference to FIG. 17. The receiver 1510 may utilize a single antenna or a set of antennas.

The base station communications manager 1515 may be an example of aspects of the base station communications manager 1415 as described herein. The base station communications manager 1515 may include a configuration manager 1520, a network condition manager 1525, a bandwidth part selection manager 1530, and a control message initiation manager 1535. The base station communications manager 1515 may be an example of aspects of the base station communications manager 1605 described herein.

The configuration manager 1520 may transmit, to a device, configuration information indicating that a first bandwidth part is associated with a first transceiver node and a second bandwidth part is associated with a second transceiver node. The network condition manager 1525 may determine that a network condition has been met.

The bandwidth part selection manager 1530 may select, based on the determination that the network condition has been met, a third bandwidth part to be associated with the first transceiver node, the third bandwidth part different from the first bandwidth part.

The control message initiation manager 1535 may initiate a control message to be transmitted to the device from the first transceiver node on the first bandwidth part, where the control message includes an indication of the third bandwidth part.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
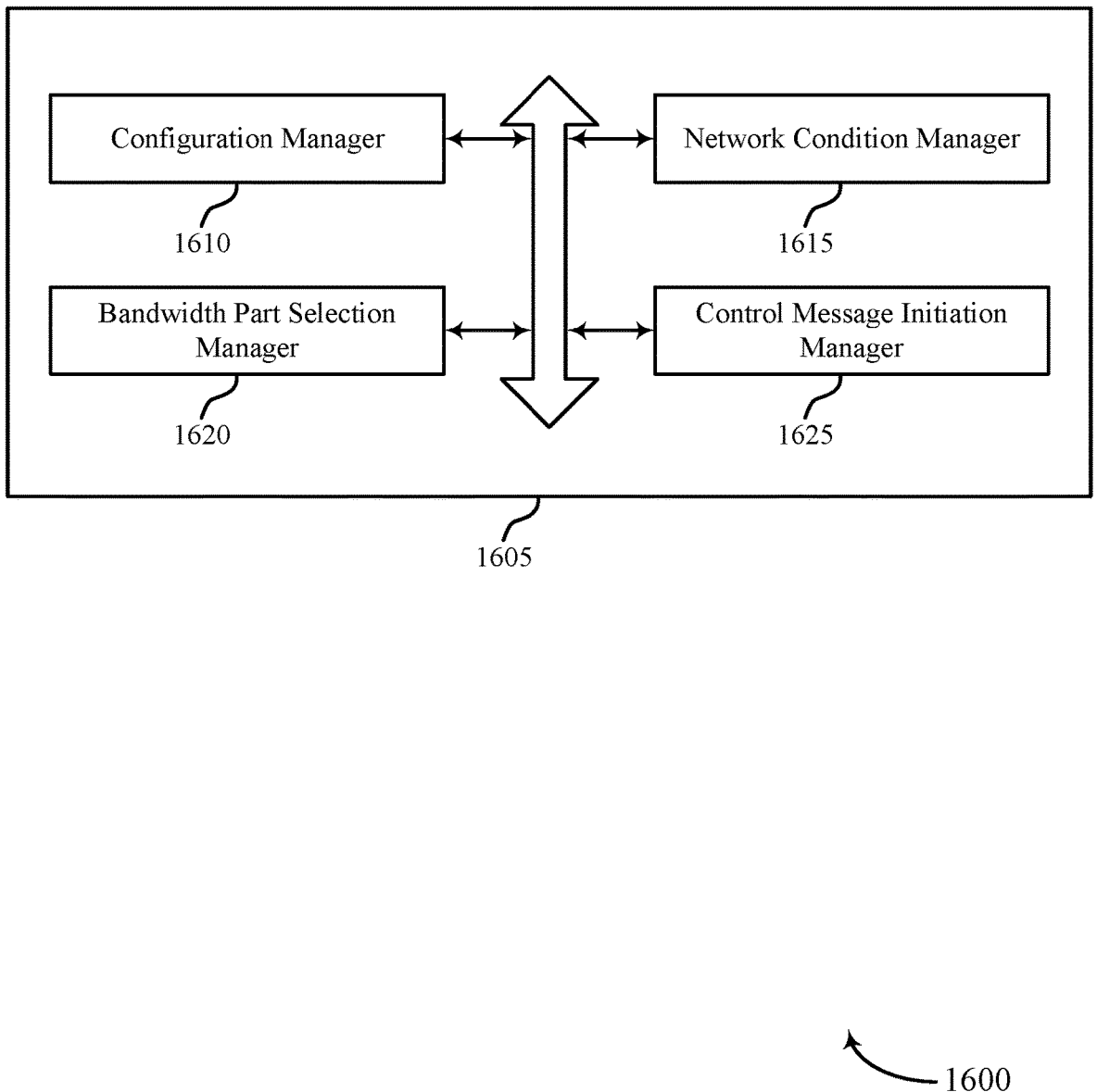
FIG. 16 shows a block diagram of a base station communications manager that supports bandwidth part switching for multiple transceiver nodes in accordance with aspects of the present disclosure.

FIG. 16 shows a block diagram 1600 of a base station communications manager 1605 that supports bandwidth part switching for multiple transceiver nodes in accordance with aspects of the present disclosure. The base station communications manager 1605 may be an example of aspects of a base station communications manager 1415 or a base station communications manager 1515 described herein. The base station communications manager 1605 may include a configuration manager 1610, a network condition manager 1615, a bandwidth part selection manager 1620, and a control message initiation manager 1625. Each of these modules may communicate, directly or indirectly, with one another (e.g., via one or more buses).

The configuration manager 1610 may transmit, to a device, configuration information indicating that a first bandwidth part is associated with a first transceiver node and a second bandwidth part is associated with a second transceiver node. The network condition manager 1615 may determine that a network condition has been met.

The bandwidth part selection manager 1620 may select, based on the determination that the network condition has been met, a third bandwidth part to be associated with the first transceiver node, the third bandwidth part different from the first bandwidth part.

The control message initiation manager 1625 may initiate a control message to be transmitted to the device from the first transceiver node on the first bandwidth part, where the control message includes an indication of the third bandwidth part.

Figure 17:
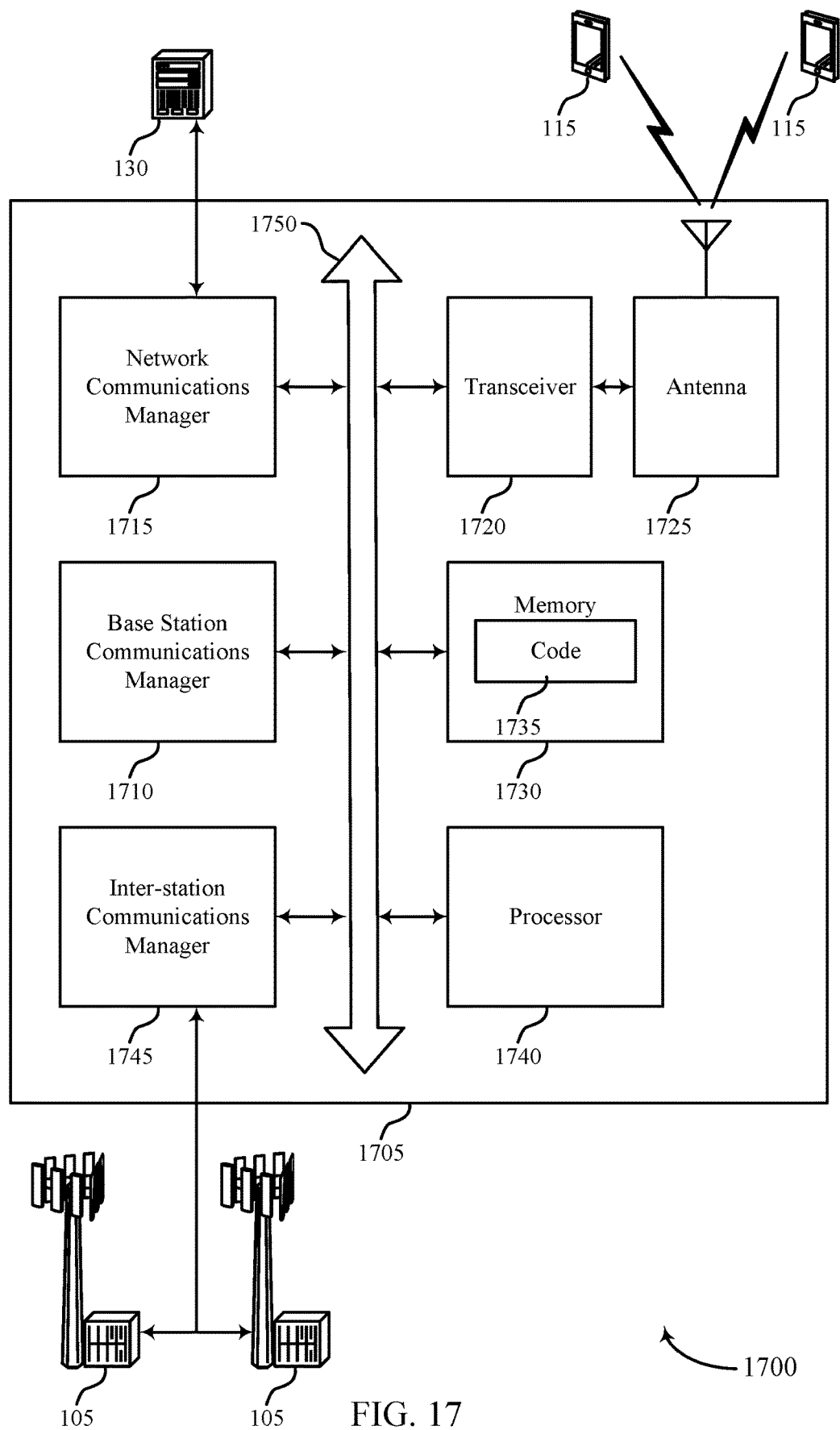
FIG. 17 shows a diagram of a system including a device that supports bandwidth part switching for multiple transceiver nodes in accordance with aspects of the present disclosure.

FIG. 17 shows a diagram of a system 1700 including a device 1705 that supports bandwidth part switching for multiple transceiver nodes in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a base station communications manager 1710, a network base station communications manager 1715, a transceiver 1720, an antenna 1725, memory 1730, a processor 1740, and an inter-station base station communications manager 1745. These components may be in electronic communication via one or more buses (e.g., bus 1750).

The base station communications manager 1710 may transmit, to a device, configuration information indicating that a first bandwidth part is associated with a first transceiver node and a second bandwidth part is associated with a second transceiver node, determine that a network condition has been met, select, based on the determination that the network condition has been met, a third bandwidth part to be associated with the first transceiver node, the third bandwidth part different from the first bandwidth part, and initiate a control message to be transmitted to the device from the first transceiver node on the first bandwidth part, where the control message includes an indication of the third bandwidth part.

The network base station communications manager 1715 may manage communications with the core network (e.g., via one or more wired backhaul links). For example, the network base station communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device #{device} to perform various functions (e.g., functions or tasks supporting bandwidth part switching for multiple transceiver nodes).

The inter-station base station communications manager 1745 may manage communications with other base station 105, and may include a controller or scheduler for controlling communications with UEs 115 in cooperation with other base stations 105. For example, the inter-station base station communications manager 1745 may coordinate scheduling for transmissions to UEs 115 for various interference mitigation techniques such as beamforming or joint transmission. In some examples, the inter-station base station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
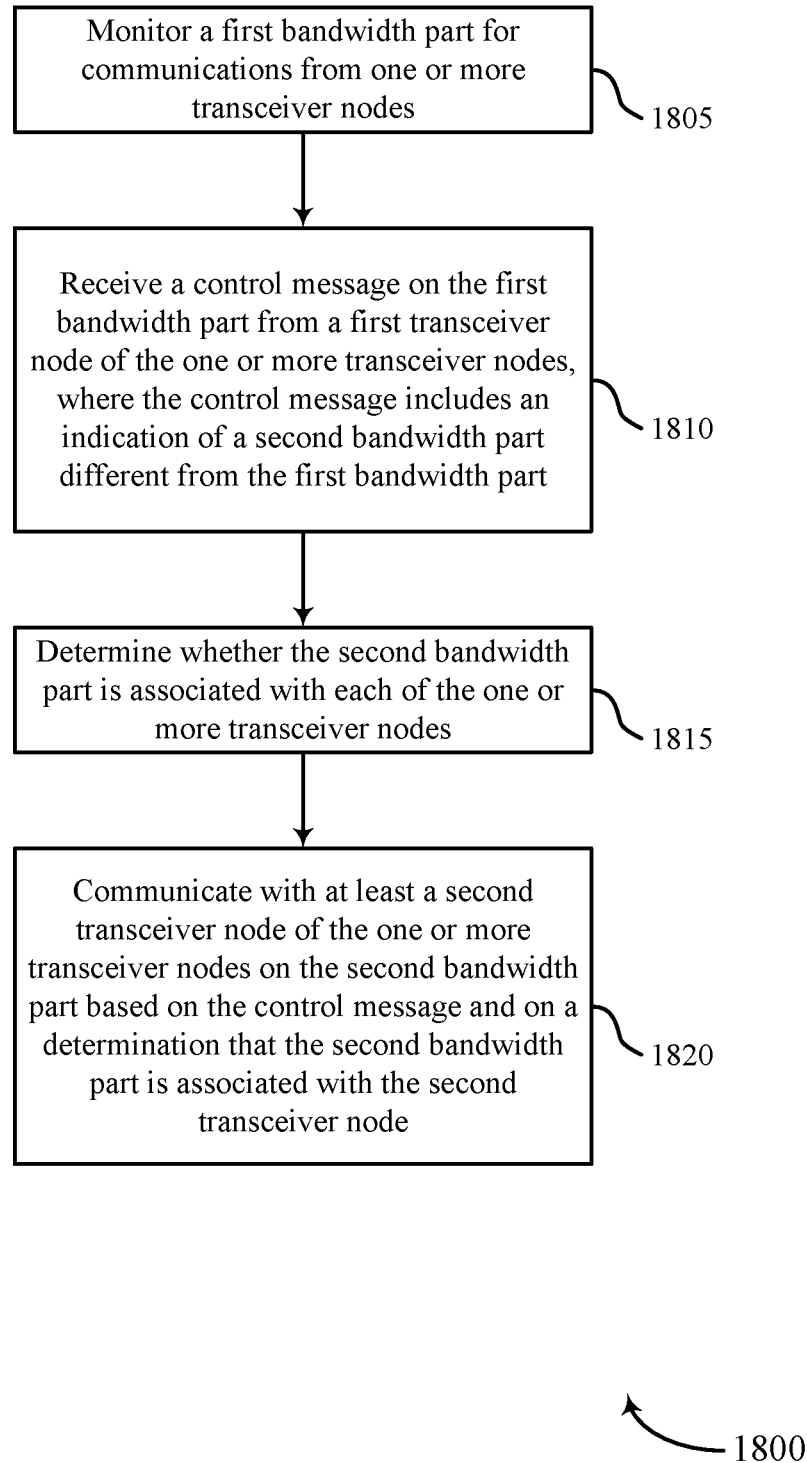
FIGS. 18 through 20 illustrate methods for bandwidth part switching for multiple transceiver nodes in accordance with aspects of the present disclosure.

FIG. 18 shows a flowchart illustrating a method 1800 that supports bandwidth part switching for multiple transceiver nodes in accordance with aspects of the present disclosure. The operations of method 1800 may be implemented by a UE 115-a or its components as described herein. For example, the operations of method 1800 may be performed by a UE communications manager as described with reference to FIGS. 10 through 18. In some examples, a UE may execute a set of instructions to control the functional elements of the UE to perform the functions described below. Additionally or alternatively, a UE may perform aspects of the functions described below using special-purpose hardware.

At 1805, the UE may monitor a first bandwidth part for communications from one or more transceiver nodes. The operations of 1805 may be performed according to the methods described herein. In some examples, aspects of the operations of 1805 may be performed by a monitoring manager as described with reference to FIGS. 10 through 13.

At 1810, the UE may receive a control message on the first bandwidth part from a first transceiver node of the one or more transceiver nodes, where the control message includes an indication of a second bandwidth part different from the first bandwidth part. The operations of 1810 may be performed according to the methods described herein. In some examples, aspects of the operations of 1810 may be performed by a control message manager as described with reference to FIGS. 10 through 13.

At 1815, the UE may determine whether the second bandwidth part is associated with each of the one or more transceiver nodes. The operations of 1815 may be performed according to the methods described herein. In some examples, aspects of the operations of 1815 may be performed by an association manager as described with reference to FIGS. 10 through 13.

At 1820, the UE may communicate with at least a second transceiver node of the one or more transceiver nodes on the second bandwidth part based on the control message and on a determination that the second bandwidth part is associated with the second transceiver node. The operations of 1820 may be performed according to the methods described herein. In some examples, aspects of the operations of 1820 may be performed by a communication manager as described with reference to FIGS. 10 through 13.

Figure 19:
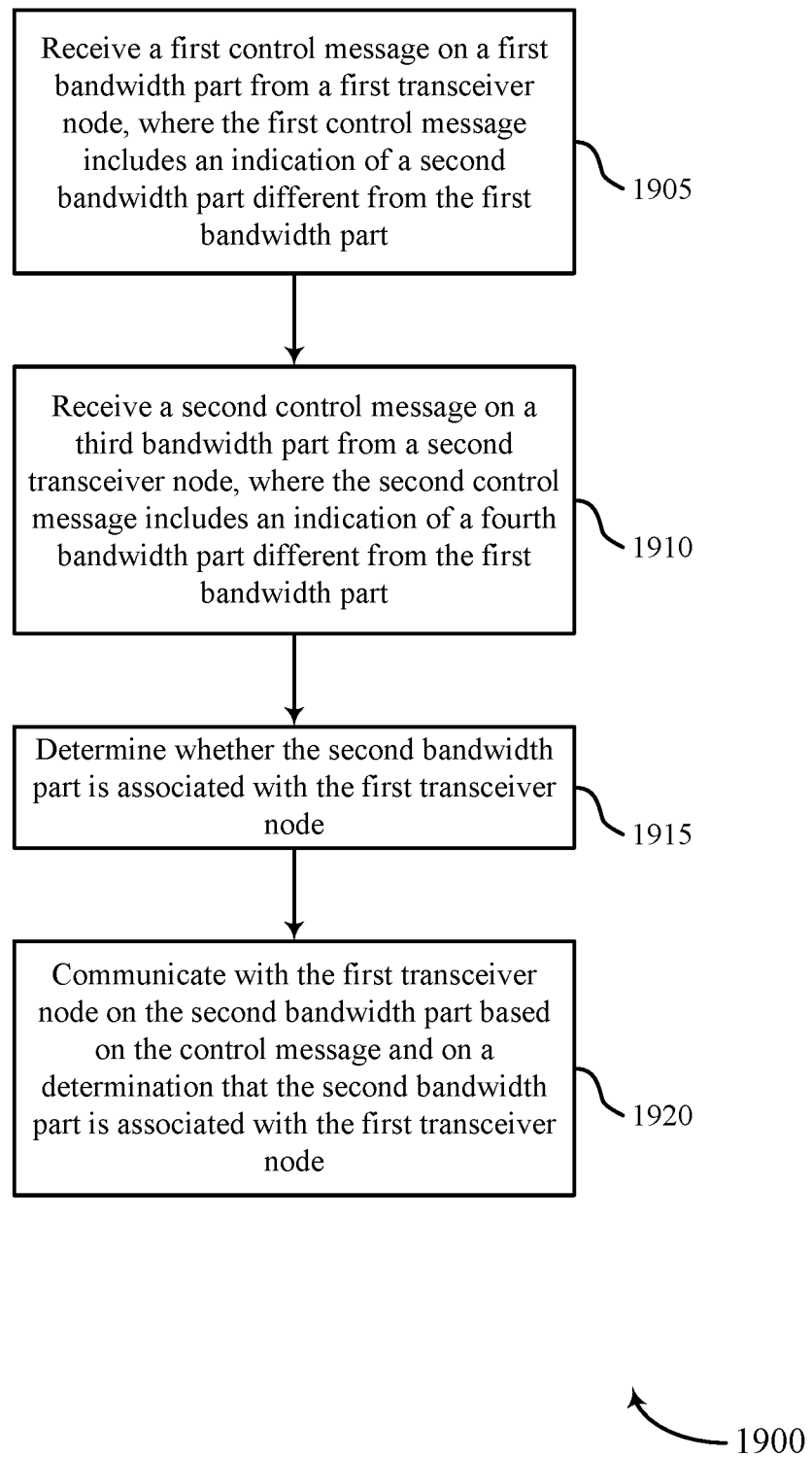

FIG. 19 shows a flowchart illustrating a method 1900 that supports bandwidth part switching for multiple transceiver nodes in accordance with aspects of the present disclosure. The operations of method 1900 may be implemented by a UE 115-a or its components as described herein. For example, the operations of method 1900 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1905, the UE may receive a first control message on a first bandwidth part from a first transceiver node, where the first control message includes an indication of a second bandwidth part different from the first bandwidth part. The operations of 1905 may be performed according to the methods described herein. In some examples, aspects of the operations of 1905 may be performed by a control message manager as described with reference to FIGS. 10 through 13.

At 1910, the UE may receive a second control message on a third bandwidth part from a second transceiver node, where the second control message includes an indication of a fourth bandwidth part different from the third bandwidth part. The operations of 1910 may be performed according to the methods described herein. In some examples, aspects of the operations of 1910 may be performed by a control message manager as described with reference to FIGS. 10 through 13.

At 1915, the UE may determine whether the second bandwidth part is associated with the first transceiver node. The operations of 1915 may be performed according to the methods described herein. In some examples, aspects of the operations of 1915 may be performed by an association manager as described with reference to FIGS. 10 through 13.

At 1920, the UE may communicate with the first transceiver node on the second bandwidth part based on the control message and on a determination that the second bandwidth part is associated with the first transceiver node. The operations of 1920 may be performed according to the methods described herein. In some examples, aspects of the operations of 1920 may be performed by a UE communication manager as described with reference to FIGS. 10 through 13.

Figure 20:
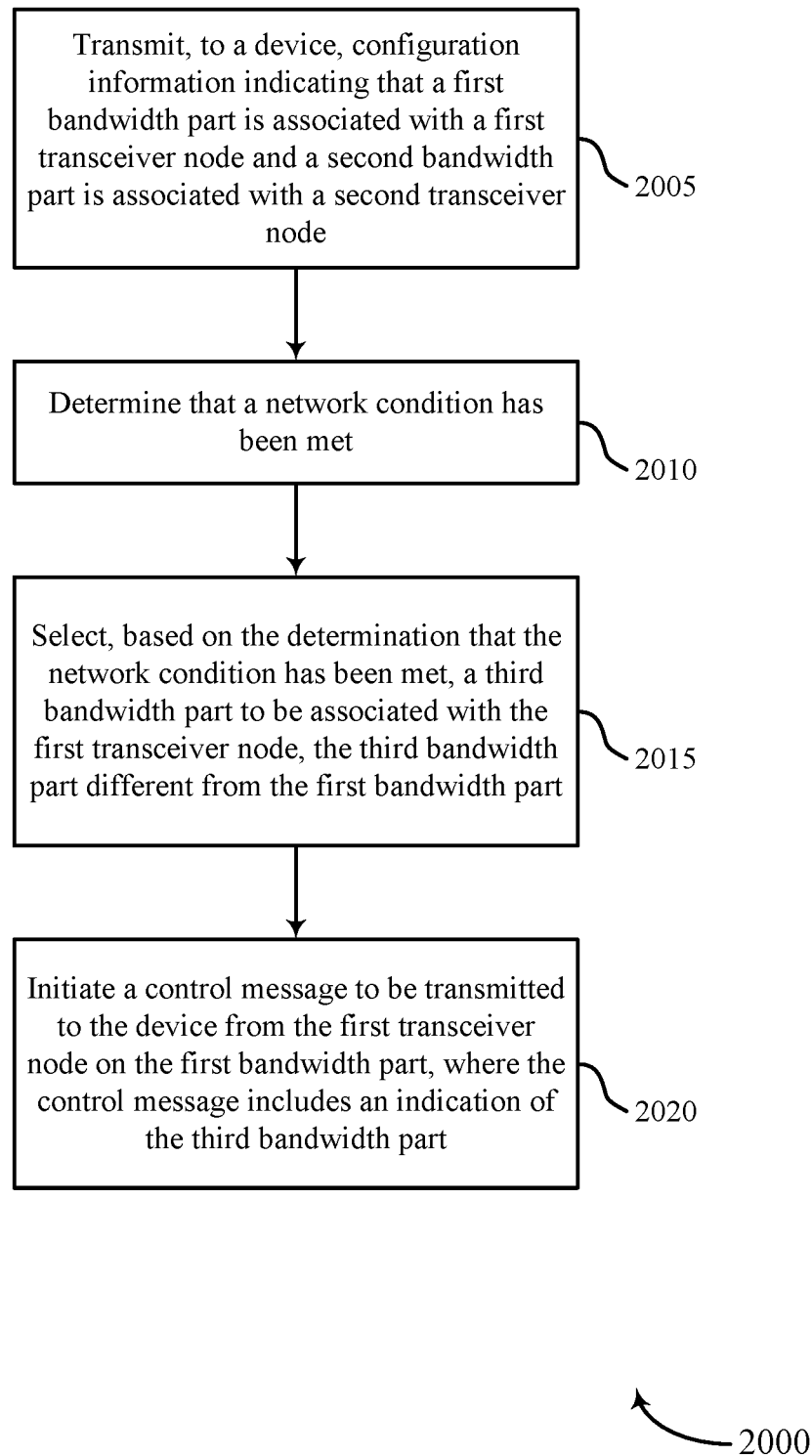

FIG. 20 shows a flowchart illustrating a method 2000 that supports bandwidth part switching for multiple transceiver nodes in accordance with aspects of the present disclosure. The operations of method 2000 may be implemented by a base station 105 or its components as described herein. For example, the operations of method 2000 may be performed by a base station communications manager as described with reference to FIGS. 14 through 17. In some examples, a base station may execute a set of instructions to control the functional elements of the base station to perform the functions described below.

Additionally or alternatively, a base station may perform aspects of the functions described below using special-purpose hardware.

At 2005, the base station may transmit, to a device, configuration information indicating that a first bandwidth part is associated with a first transceiver node and a second bandwidth part is associated with a second transceiver node. The operations of 2005 may be performed according to the methods described herein. In some examples, aspects of the operations of 2005 may be performed by a configuration manager as described with reference to FIGS. 14 through 17.

At 2010, the base station may determine that a network condition has been met. The operations of 2010 may be performed according to the methods described herein. In some examples, aspects of the operations of 2010 may be performed by a network condition manager as described with reference to FIGS. 14 through 17.

At 2015, the base station may select, based on the determination that the network condition has been met, a third bandwidth part to be associated with the first transceiver node, the third bandwidth part different from the first bandwidth part. The operations of 2015 may be performed according to the methods described herein. In some examples, aspects of the operations of 2015 may be performed by a bandwidth part selection manager as described with reference to FIGS. 14 through 17.

At 2020, the base station may initiate a control message to be transmitted to the device from the first transceiver node on the first bandwidth part, where the control message includes an indication of the third bandwidth part. The operations of 2020 may be performed according to the methods described herein. In some examples, aspects of the operations of 2020 may be performed by a control message initiation manager as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein. Thus, example 1 is a method for wireless communication at a UE that includes: monitoring a first bandwidth part for communications from one or more transceiver nodes; receiving a control message on the first bandwidth part from a first transceiver node of the one or more transceiver nodes, wherein the control message comprises an indication of a second bandwidth part different from the first bandwidth part; determining whether the second bandwidth part is associated with each of the one or more transceiver nodes; and communicating with at least a second transceiver node of the one or more transceiver nodes on the second bandwidth part based at least in part on the control message and on a determination that the second bandwidth part is associated with the second transceiver node.

In example 2, the method of example 1 may include communicating with at least the second transceiver node on the second bandwidth part comprises transmitting a first signal to the second transceiver node on the second bandwidth part or receiving a second signal from the second transceiver node on the second bandwidth part.

In example 3, the methods of examples 1 and 2 may include the case when the second transceiver node is the same as the first transceiver node.

In example 4, the methods of examples 1-3 may include the case when the second transceiver node is different than the first transceiver node, and may include communicating with the first transceiver node on the second bandwidth part based at least in part on the control message and on a determination that the second bandwidth part is associated with the first transceiver node.

In example 5, the methods of examples 1-4 may include refraining from communicating with the first transceiver node based at least in part on the control message and on a determination that the second bandwidth part is not associated with the first transceiver node.

In example 6, the methods of examples 1-5 may include the case when monitoring the first bandwidth part for communications from the one or more transceiver nodes comprises monitoring the first bandwidth part for communications from the second transceiver node.

In example 7, the methods of examples 1-6 may include the case when the control message comprises one or more indications corresponding to each of the one or more transceiver nodes, wherein the one or more indications indicates whether the UE should communicate with the respective transceiver node on the second bandwidth part.

In example 8, the methods of examples 1-7 may include determining, based on a first indication of the one or more indications, whether the UE should communicate with the first transceiver node on the second bandwidth part.

In example 9, the methods of examples 1-8 may include communicating with the first transceiver node on the second bandwidth part based at least in part on the control message, on a determination that the UE should communicate with the first transceiver node on the second bandwidth part, and on a determination that the second bandwidth part is associated with the first transceiver node.

In example 10, the methods of examples 1-9 may include refraining from communicating with the first transceiver node on the second bandwidth part based at least in part on a determination that the UE should not communicate with the first transceiver node on the second bandwidth part.

In example 11, the methods of claims 1-10 may include determining, based on a second indication of the one or more indications, whether the UE should communicate with the second transceiver node on the second bandwidth part, wherein communicating with the second transceiver node on the second bandwidth part is based at least in part on a determination that the UE should communicate with the second transceiver node on the second bandwidth part.

In example 12, the methods of claims 1-11 may include the case where the control message is received via a physical downlink control channel (PDCCH).

In example 13, the methods of claims 1-12 may include the case where the control message is received via downlink control information (DCI).

In example 14, the methods of claims 1-13 may include the case where the first transceiver node comprises a first transmission/reception point (TRP) and the second transceiver node comprises a second TRP.

Example 16 is a method for wireless communication at a UE that includes: receiving a first control message on a first bandwidth part from a first transceiver node, wherein the first control message comprises an indication of a second bandwidth part different from the first bandwidth part; receiving a second control message on a third bandwidth part from a second transceiver node, wherein the second control message comprises an indication of a fourth bandwidth part different from the third bandwidth part; determining whether the second bandwidth part is associated with the first transceiver node; and communicating with the first transceiver node on the second bandwidth part based at least in part on the first control message and on a determination that the second bandwidth part is associated with the first transceiver node.

In example 17, the method of example 16 may include communicating with the first transceiver node on the second bandwidth part comprises transmitting a first signal to the first transceiver node on the second bandwidth part or receiving a second signal from the first transceiver node on the second bandwidth part.

In example 18, the method of examples 16 and 17 may include determining whether the fourth bandwidth part is associated with the second transceiver node; and communicating with the second transceiver node on the fourth bandwidth part based at least in part on the second control message and on a determination that the fourth bandwidth part is associated with the second transceiver node.

In example 19, the method of examples 16-18 may include refraining from communicating with the second transceiver node on the fourth bandwidth part based at least in part on a determination that the fourth bandwidth part is not associated with the second transceiver node.

In example 20, the method of examples 16-19 may include communicating with the second transceiver node on the third bandwidth part based at least in part on a determination that the fourth bandwidth part is not associated with the second transceiver node.

In example 21, the method of examples 16-20 may include refraining from communicating with the second transceiver node based at least in part on a determination that the fourth bandwidth part is not associated with the second transceiver node.

In example 22, the method of examples 16-21 may include the case when the first bandwidth part is the same as the third bandwidth part.

In example 23, the method of examples 16-22 may include the case when the second bandwidth part is the same as the fourth bandwidth part.

In example 24, the method of examples 16-23 may include the case when the first control message is received via a first physical downlink control channel (PDCCH).

In example 25, the method of examples 16-24 may include the case when the second control message is received via a second physical downlink control channel (PDCCH).

In example 26, the method of examples 16-25 may include the case when the first control message and the second control message are received via downlink control information (DCI).

In example 27, the method of examples 16-26 may include the case when the first transceiver node comprises a first transmission/reception point (TRP) and the second transceiver node comprises a second TRP.

In example 28, the method of examples 16-27 may include receiving configuration information indicating whether the second bandwidth part is associated with the first transceiver node, wherein determining whether the second bandwidth part is associated with the first transceiver node comprises determining whether the second bandwidth part is associated with the first transceiver node based at least in part on the configuration information.

Example 29 is a method for wireless communication at a base station that includes: transmitting, to a device, configuration information indicating that a first bandwidth part is associated with a first transceiver node and a second bandwidth part is associated with a second transceiver node; determining that a network condition has been met; selecting, based at least in part on the determination that the network condition has been met, a third bandwidth part to be associated with the first transceiver node, the third bandwidth part different from the first bandwidth part; and initiating a control message to be transmitted to the device from the first transceiver node on the first bandwidth part, wherein the control message comprises an indication of the third bandwidth part.

In example 30, the method of example 29 may include the case when the third bandwidth part is selected to be associated with the second transceiver node.

In example 31, the methods of examples 29 and 30 may include selecting, based at least in part on the determination that the network condition has been met, a fourth bandwidth part to be associated with the second transceiver node, the fourth bandwidth part different from the second bandwidth part; and initiating a second control message to be transmitted to the device from the second transceiver node on the second bandwidth part, wherein the second control message comprises an indication of the fourth bandwidth part.

In example 32, the methods of examples 29-31 may include the case when selecting the fourth bandwidth part comprises: determining whether the device supports communication via multiple bandwidth parts.

In example 33, the methods of examples 29-32 may include the case when the control message comprises a first indication of whether the UE should communicate with the first transceiver node on the third bandwidth part and a second indication of whether the UE should communicate with the second transceiver node on the third bandwidth part.

In example 34, the methods of examples 29-33 may include the case when selecting the third bandwidth part comprises: determining that the first transceiver node is associated with the third bandwidth part.

In example 35, the methods of examples 29-34 may include the case when selecting the third bandwidth part comprises: determining that the second transceiver node is associated with the third bandwidth part.

In example 36, the methods of examples 29-35 may include the case when selecting the third bandwidth part comprises: selecting the third bandwidth part based on a difference in a width of the third bandwidth part relative to a width of the first bandwidth part.

In example 37, the methods of examples 29-36 may include the case when selecting the third bandwidth part comprises: selecting the third bandwidth part from a predefined set of bandwidth parts.

In example 38, the methods of examples 29-37 may include the case when determining that the network condition has been met comprises: determining that a signal quality metric for the third bandwidth part is higher than the signal quality metric for the first bandwidth part.

In example 39, the methods of examples 29-38 may include the case when determining that the network condition has been met comprises: determining that a communication rate for the device is below a threshold.

In example 40, the methods of examples 29-39 may include the case when the configuration information is transmitted to the device via radio resource control (RRC) signaling.

In example 41, the methods of examples 29-40 may include the case when initiating the control message to be transmitted comprises: initiating the control message to be transmitted via a physical downlink control channel (PDCCH).

In example 42, the methods of examples 29-41 may include the case when the control message comprises downlink control information (DCI) comprising the indication of the third bandwidth.

In example 43, the methods of examples 29-42 may include communicating with the device via the first transceiver node and the third bandwidth part after initiating the control message.

In example 44, the methods of examples 29-43 may include the case when the first transceiver node comprises a first transmission/reception point (TRP) and the second transceiver node comprises a second TRP.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a first control message on a first bandwidth part from a first transceiver node, wherein the first control message comprises an indication of a second bandwidth part different from the first bandwidth part;
   receiving a second control message on a third bandwidth part from a second transceiver node, wherein the second control message comprises an indication of a fourth bandwidth part different from the third bandwidth part;
   determining whether the second bandwidth part is associated with the first transceiver node;
   communicating with the first transceiver node on the second bandwidth part based at least in part on the first control message and on a determination that the second bandwidth part is associated with the first transceiver node;
   determining whether the fourth bandwidth part is associated with the second transceiver node; and
   continuing to communicate with the second transceiver node on the third bandwidth part when the fourth bandwidth part is not associated with the second transceiver node.

2. The method of claim 1, wherein:
   communicating with the first transceiver node on the second bandwidth part comprises transmitting a first signal to the first transceiver node on the second bandwidth part or receiving a second signal from the first transceiver node on the second bandwidth part.

3. The method of claim 1, wherein the first bandwidth part is the same as the third bandwidth part, and wherein the second bandwidth part is the same as the fourth bandwidth part.

4. The method of claim 1, wherein the first control message and the second control message are received via downlink control information (DCI).

5. The method of claim 1, wherein the first transceiver node comprises a first transmission/reception point (TRP) and the second transceiver node comprises a second TRP.

6. The method of claim 1, further comprising:
   receiving configuration information indicating whether the second bandwidth part is associated with the first transceiver node, wherein determining whether the second bandwidth part is associated with the first transceiver node comprises determining whether the second bandwidth part is associated with the first transceiver node based at least in part on the configuration information.

7. A method for wireless communication at a user equipment (UE), comprising:
   monitoring a first bandwidth part for communications from one or more transceiver nodes;
   receiving a control message on the first bandwidth part from a first transceiver node of the one or more transceiver nodes, wherein the control message comprises an indication of a second bandwidth part different from the first bandwidth part;
   determining whether the second bandwidth part is associated with each of the one or more transceiver nodes; and
   communicating with at least the first transceiver node and a second transceiver node of the one or more transceiver nodes on the second bandwidth part based at least in part on the control message and when the second bandwidth part is associated with the first transceiver node and the second transceiver node, wherein the second transceiver node is different than the first transceiver node.

8. The method of claim 7, wherein:
communicating with at least the second transceiver node on the second bandwidth part comprises transmitting a first signal to the second transceiver node on the second bandwidth part or receiving a second signal from the second transceiver node on the second bandwidth part.

9. The method of claim 7, further comprising:
refraining from communicating with the first transceiver node based at least in part on the control message and when the second bandwidth part is not associated with the first transceiver node.

10. The method of claim 7, wherein monitoring the first bandwidth part for communications from the one or more transceiver nodes comprises:
monitoring the first bandwidth part for communications from the second transceiver node.

11. The method of claim 7, wherein the control message comprises one or more indications corresponding to each of the one or more transceiver nodes, wherein the one or more indications indicates whether the UE should communicate with the respective transceiver node on the second bandwidth part.

12. The method of claim 11, further comprising:
determining, based on a first indication of the one or more indications, whether the UE should communicate with the first transceiver node on the second bandwidth part.

13. The method of claim 12, further comprising:
communicating with the first transceiver node on the second bandwidth part based at least in part on the control message, on a determination that the UE should communicate with the first transceiver node on the second bandwidth part, and on a determination that the second bandwidth part is associated with the first transceiver node.

14. The method of claim 12, further comprising:
refraining from communicating with the first transceiver node on the second bandwidth part based at least in part on a determination that the UE should not communicate with the first transceiver node on the second bandwidth part.

15. The method of claim 11, further comprising:
determining, based on a second indication of the one or more indications, whether the UE should communicate with the second transceiver node on the second bandwidth part, wherein communicating with the second transceiver node on the second bandwidth part is based at least in part on a determination that the UE should communicate with the second transceiver node on the second bandwidth part.

16. The method of claim 7, wherein the first transceiver node comprises a first transmission/reception point (TRP) and the second transceiver node comprises a second TRP.

17. The method of claim 7, further comprising:
receiving configuration information indicating whether the second bandwidth part is associated with each of the one or more transceiver nodes, wherein determining whether the second bandwidth part is associated with each of the one or more transceiver nodes comprises determining whether the second bandwidth part is associated with the first transceiver node and with the second transceiver node based at least in part on the configuration information.

18. A method for wireless communication at a base station, comprising:
transmitting, to a device, configuration information indicating that a first bandwidth part and a second bandwidth part are associated with a first transceiver node, that the second bandwidth part is associated with a second transceiver node, and that the first bandwidth part is not associated with the second transceiver node;
determining that a network condition has been met;
selecting, based at least in part on the determination that the network condition has been met, a switch from the second bandwidth part to the first bandwidth part, the second bandwidth part different from the first bandwidth part;
initiating a first control message to be transmitted to the device from the first transceiver node on the second bandwidth part, wherein the first control message comprises an indication of switching from the second bandwidth part to the first bandwidth part; and
initiating a second control message to be transmitted to the device from the second transceiver node on the second bandwidth part, wherein the second control message comprises an indication of switching from the second bandwidth part to the first bandwidth part.

19. The method of claim 18, further comprising:
selecting the switch from the second bandwidth part to the first bandwidth part based at least in part on the determination that the network condition indicates increased data throughput on the first bandwidth part.

20. The method of claim 19, wherein selecting the switch from the second bandwidth part to the first bandwidth part comprises:
determining whether the device supports communication via multiple bandwidth parts.

21. The method of claim 18, wherein the first control message comprises a first indication of whether the UE should communicate with the first transceiver node on the first bandwidth part and a second indication of whether the UE should communicate with the second transceiver node on the first bandwidth part.

22. An apparatus for wireless communication at a user equipment (UE), comprising: a processor, memory in electronic communication with the processor; and instructions stored in the memory and executable by the processor to cause the apparatus to:
receive a first control message on a first bandwidth part from a first transceiver node, wherein the first control message comprises an indication of a second bandwidth part different from the first bandwidth part;
receive a second control message on a third bandwidth part from a second transceiver node, wherein the second control message comprises an indication of a fourth bandwidth part different from the third bandwidth part;
determine whether the second bandwidth part is associated with the first transceiver node;
communicate with the first transceiver node on the second bandwidth part based at least in part on the first control message and on a determination that the second bandwidth part is associated with the first transceiver node;
determine whether the fourth bandwidth part is associated with the second transceiver node; and
continue to communicate with the second transceiver node on the third bandwidth part when the fourth bandwidth part is not associated with the second transceiver node.

* * * * *